(12) United States Patent
Rosenberg

(10) Patent No.: US 7,542,816 B2
(45) Date of Patent: Jun. 2, 2009

(54) SYSTEM, METHOD AND COMPUTER PROGRAM PRODUCT FOR AUTOMATICALLY SELECTING, SUGGESTING AND PLAYING MUSIC MEDIA FILES

(75) Inventor: Louis B. Rosenberg, Arroyo Grande, CA (US)

(73) Assignee: Outland Research, LLC, Pismo Beach, CA (US)

( * ) Notice: Subject to any disclaimer, the term of this patent is extended or adjusted under 35 U.S.C. 154(b) by 530 days.

(21) Appl. No.: 11/267,079

(22) Filed: Nov. 3, 2005

(65) Prior Publication Data

US 2006/0167576 A1 Jul. 27, 2006

Related U.S. Application Data

(60) Provisional application No. 60/648,197, filed on Jan. 27, 2005, provisional application No. 60/665,291, filed on Mar. 26, 2005.

(51) Int. Cl.
*G06F 17/00* (2006.01)

(52) U.S. Cl. ............................ 700/94; 84/612; 715/716; 707/104.1

(58) Field of Classification Search ........................ None
See application file for complete search history.

(56) References Cited

U.S. PATENT DOCUMENTS

| | | | |
|---|---|---|---|
| 4,018,121 A | 4/1977 | Chowing |
| 4,054,749 A | 10/1977 | Suzuki |
| 4,091,302 A | 5/1978 | Yamashita |
| 4,360,345 A | 11/1982 | Hon |
| 4,403,208 A | 9/1983 | Hodgson et al. |
| 4,430,595 A | 2/1984 | Nakasone |

(Continued)

FOREIGN PATENT DOCUMENTS

DE 19650900 6/1998

(Continued)

OTHER PUBLICATIONS

"Habitat Telemonitoring System Based On The Sound Surveillance," by Eric Castelli, Michel Vacher, Dan Istrate, Laurent Besacier, and Jean-Francois Sérignat.

(Continued)

*Primary Examiner*—Curtis Kuntz
*Assistant Examiner*—Paul McCord
(74) *Attorney, Agent, or Firm*—Thomas F. Lebens; Sinsheimer Juhnke Lebens & McIvor, LLP

(57) ABSTRACT

System, method and computer program product to intelligently correlate ambient sensor signals, chronographic information, daily life schedule information, and/or external meteorological information with a user's previous music media file selection patterns for predicting future music media file play recommendations to a user of a portable media player. The sensors include but are not limited to a meteorological sensor, a physiological sensor, a geo-spatial sensor, a motion sensor, an inclination sensor, an environmental sensor, and a combination thereof. Music media file selection information includes user spontaneous selections of music media files and/or user acceptances or rejections of software suggested music media files. Various embodiments of the invention provide for gait matching and/or tempo adjustment in dependence on the received sensor signals and the selection, suggestion and/or automatic play of music media files.

16 Claims, 5 Drawing Sheets

U.S. PATENT DOCUMENTS

| | | |
|---|---|---|
| 4,490,810 A | 12/1984 | Hon |
| 4,712,101 A | 12/1987 | Culver |
| 4,823,634 A | 4/1989 | Culver |
| 4,868,549 A | 9/1989 | Affinito |
| 4,907,973 A | 3/1990 | Hon |
| 4,919,418 A | 4/1990 | Miller |
| 4,934,694 A | 6/1990 | McIntosh |
| 4,949,089 A | 8/1990 | Ruszkowski, Jr. |
| 4,983,901 A | 1/1991 | Lehmer |
| 5,047,918 A | 9/1991 | Schwartz et al. |
| 5,047,952 A | 9/1991 | Kramer et al. |
| 5,164,530 A | 11/1992 | Iwase |
| 5,185,561 A | 2/1993 | Good |
| 5,186,629 A | 2/1993 | Rohen |
| 5,189,355 A | 2/1993 | Larkins |
| 5,220,260 A | 6/1993 | Schuler |
| 5,273,038 A | 12/1993 | Beavin |
| 5,296,846 A | 3/1994 | Ledley |
| 5,296,871 A | 3/1994 | Paley |
| 5,451,192 A | 9/1995 | Hefele |
| 5,499,360 A | 3/1996 | Barbara et al. |
| 5,534,917 A | 7/1996 | MacDougall |
| 5,559,412 A | 9/1996 | Schuler |
| 5,572,201 A | 11/1996 | Graham et al. |
| 5,614,687 A | 3/1997 | Yamada et al. |
| 5,629,594 A | 5/1997 | Jacobus |
| 5,634,051 A | 5/1997 | Thomson |
| 5,643,087 A | 7/1997 | Marcus |
| 5,666,138 A | 9/1997 | Culver |
| 5,690,582 A | 11/1997 | Ulrich et al. |
| 5,699,441 A | 12/1997 | Sagawa et al. |
| 5,701,140 A | 12/1997 | Rosenberg |
| 5,704,791 A | 1/1998 | Gillio |
| 5,709,219 A | 1/1998 | Chen |
| 5,721,566 A | 2/1998 | Rosenberg |
| 5,724,264 A | 3/1998 | Rosenberg |
| 5,728,960 A | 3/1998 | Sitrick |
| 5,731,804 A | 3/1998 | Rosenberg |
| 5,742,278 A | 4/1998 | Chen |
| 5,747,714 A | 5/1998 | Kniest et al. |
| 5,754,023 A | 5/1998 | Roston |
| 5,755,577 A | 5/1998 | Gillio |
| 5,767,839 A | 6/1998 | Rosenberg |
| 5,769,640 A | 6/1998 | Jacobus |
| 5,791,908 A | 8/1998 | Gillio |
| 5,800,177 A | 9/1998 | Gillio |
| 5,800,178 A | 9/1998 | Gillio |
| 5,807,267 A | 9/1998 | Bryars et al. |
| 5,821,920 A | 10/1998 | Rosenberg |
| 5,825,308 A | 10/1998 | Rosenberg |
| 5,828,197 A | 10/1998 | Martin |
| 5,839,901 A | 11/1998 | Karkanen |
| 5,857,939 A | 1/1999 | Kaufman |
| 5,870,740 A | 2/1999 | Rose et al. |
| 5,882,206 A | 3/1999 | Gillio |
| 5,889,670 A | 3/1999 | Schuler |
| 5,889,672 A | 3/1999 | Schuler |
| 5,890,128 A | 3/1999 | Diaz et al. |
| 5,890,995 A | 4/1999 | Bobick et al. |
| 5,897,437 A | 4/1999 | Nishiumi |
| 5,928,248 A | 7/1999 | Acker |
| 5,941,837 A | 8/1999 | Amano et al. |
| 5,952,596 A | 9/1999 | Kondo |
| 5,953,693 A | 9/1999 | Sakiyama et al. |
| 5,989,188 A | 11/1999 | Birkhoelzer et al. |
| 6,024,576 A | 2/2000 | Bevirt et al. |
| 6,088,017 A | 7/2000 | Tremblay |
| 6,096,004 A | 8/2000 | Megland |
| 6,106,301 A | 8/2000 | Merril |
| 6,111,577 A | 8/2000 | Ziles |
| 6,119,114 A | 9/2000 | Smadja |
| 6,154,201 A | 11/2000 | Levin et al. |
| 6,160,489 A | 12/2000 | Perry |
| 6,192,340 B1 | 2/2001 | Abecassis |
| 6,199,067 B1 | 3/2001 | Geller |
| 6,211,861 B1 | 4/2001 | Rosenberg et al. |
| 6,244,742 B1 | 6/2001 | Yamada |
| 6,256,011 B1 | 7/2001 | Culver |
| 6,287,262 B1 | 9/2001 | Amano et al. |
| 6,292,747 B1 | 9/2001 | Amro et al. |
| 6,298,323 B1 | 10/2001 | Kaemmerer |
| 6,300,938 B1 | 10/2001 | Culver |
| 6,304,520 B1 | 10/2001 | Watanabe |
| 6,314,094 B1 | 11/2001 | Boys et al. |
| 6,323,412 B1 | 11/2001 | Loo |
| 6,366,272 B1 | 4/2002 | Rosenberg |
| 6,376,971 B1 | 4/2002 | Pelrine |
| 6,401,027 B1 | 6/2002 | Xu et al. |
| 6,401,037 B1 | 6/2002 | Muller et al. |
| 6,411,896 B1 | 6/2002 | Shuman et al. |
| 6,417,782 B1 | 7/2002 | Darnall |
| 6,429,846 B2 | 8/2002 | Rosenberg |
| 6,470,207 B1 | 10/2002 | Simon |
| 6,470,302 B1 | 10/2002 | Cunningham |
| 6,477,239 B1 | 11/2002 | Ohki et al. |
| 6,498,982 B2 | 12/2002 | Bellesfield et al. |
| 6,515,593 B1 | 2/2003 | Stark et al. |
| 6,522,292 B1 | 2/2003 | Ellenby et al. |
| 6,526,411 B1 | 2/2003 | Ward |
| 6,529,831 B1 | 3/2003 | Smith et al. |
| 6,539,232 B2 | 3/2003 | Hendrey et al. |
| 6,563,487 B2 | 5/2003 | Martin |
| 6,564,210 B1 | 5/2003 | Korda et al. |
| 6,598,707 B2 | 7/2003 | Nakagaki et al. |
| 6,618,593 B1 | 9/2003 | Drutman et al. |
| 6,626,728 B2 | 9/2003 | Holt |
| 6,636,835 B2 | 10/2003 | Ragsdale-Elliott et al. |
| 6,640,187 B1 | 10/2003 | Chenault |
| 6,655,817 B2 | 12/2003 | Devlin |
| 6,657,116 B1 | 12/2003 | Gunnerson |
| 6,665,644 B1 | 12/2003 | Kanevsky et al. |
| 6,671,736 B2 | 12/2003 | Virine et al. |
| 6,683,538 B1 | 1/2004 | Wilkes, Jr. |
| 6,686,531 B1 | 2/2004 | Pennock et al. |
| 6,686,911 B1 | 2/2004 | Levin |
| 6,697,044 B2 | 2/2004 | Shahoian |
| 6,697,048 B2 | 2/2004 | Rosenberg et al. |
| 6,781,289 B2 | 2/2004 | Levin |
| 6,721,706 B1 | 4/2004 | Strubbe et al. |
| 6,732,090 B2 | 5/2004 | Shanahan et al. |
| 6,735,568 B1 | 5/2004 | Buckwalter et al. |
| 6,749,537 B1 | 6/2004 | Hickman |
| 6,768,066 B2 | 7/2004 | Wehrenberg ............. 200/61.49 |
| 6,768,246 B2 | 7/2004 | Pelrine |
| 6,772,026 B2 | 8/2004 | Bradbury et al. |
| 6,801,837 B2 | 10/2004 | Carlstedt et al. |
| 6,804,643 B1 | 10/2004 | Kiss |
| 6,808,472 B1 | 10/2004 | Hickman |
| 6,812,394 B2 | 11/2004 | Weissflog |
| 6,812,624 B1 | 11/2004 | Pei |
| 6,822,635 B2 | 11/2004 | Shahoian |
| 6,829,599 B2 | 12/2004 | Chidlovskii |
| 6,858,970 B2 | 2/2005 | Malkin |
| 6,863,220 B2 | 3/2005 | Selker |
| 6,871,142 B2 | 3/2005 | Kumada et al. |
| 6,879,284 B2 | 4/2005 | Dufek |
| 6,882,086 B2 | 4/2005 | Kornbluh |
| 6,885,362 B2 | 4/2005 | Suomela |
| 6,888,457 B2 * | 5/2005 | Wilkinson et al. .......... 702/182 |
| 6,906,533 B1 | 6/2005 | Yoshida |
| 6,915,295 B2 | 7/2005 | Okamoto et al. |
| 6,917,373 B2 | 7/2005 | Vong et al. |
| 6,921,351 B1 | 7/2005 | Hickman |
| 6,929,481 B1 | 8/2005 | Alexander |

| | | |
|---|---|---|
| 6,941,324 B2 | 9/2005 | Plastina et al. |
| 6,950,695 B2 | 9/2005 | Chen |
| 6,956,538 B2 | 10/2005 | Moore |
| 6,958,707 B1 | 10/2005 | Siegel |
| 6,965,842 B2 | 11/2005 | Rekimoto |
| 6,970,088 B2 | 11/2005 | Kovach |
| 6,978,684 B2 | 12/2005 | Nurse |
| 6,982,697 B2 | 1/2006 | Wilson |
| 6,982,700 B2 | 1/2006 | Rosenberg et al. |
| 6,983,139 B2 | 1/2006 | Dowling et al. |
| 6,985,143 B2 | 1/2006 | Pharr |
| 6,986,320 B2 | 1/2006 | Shelton |
| 6,987,221 B2 | 1/2006 | Platt |
| 7,007,001 B2 | 2/2006 | Oliver et al. |
| 7,012,593 B2 | 3/2006 | Yoon et al. |
| 7,023,423 B2 | 4/2006 | Rosenberg |
| 7,027,823 B2 | 4/2006 | Mikuni |
| 7,031,875 B2 | 4/2006 | Ellenby et al. |
| 7,046,588 B2 | 5/2006 | Heo |
| 7,092,964 B1 | 8/2006 | Dougherty et al. |
| 7,100,835 B2 | 9/2006 | Selker |
| 7,136,945 B2 | 11/2006 | Gibbs et al. |
| 7,138,575 B2 * | 11/2006 | Childs et al. .................. 700/94 |
| 7,156,773 B2 * | 1/2007 | Takai et al. ..................... 482/7 |
| 7,166,062 B1 | 1/2007 | Watterson et al. |
| 7,181,438 B1 | 2/2007 | Szabo |
| 7,199,708 B2 * | 4/2007 | Terauchi et al. ......... 340/539.12 |
| 7,225,565 B2 | 6/2007 | DiBenedetto et al. |
| 7,227,071 B2 * | 6/2007 | Tagawa et al. ................ 84/601 |
| 7,229,416 B2 | 6/2007 | Chen |
| 7,232,416 B2 | 6/2007 | Czernicki |
| 7,249,126 B1 | 7/2007 | Ginsburg et al. |
| 7,271,736 B2 | 9/2007 | Siegel et al. |
| 7,283,997 B1 | 10/2007 | Howard et al. |
| RE39,906 E | 11/2007 | Roston et al. |
| 7,293,060 B2 * | 11/2007 | Komsi .......................... 700/94 |
| 7,310,676 B2 | 12/2007 | Bourne |
| 7,310,895 B2 | 12/2007 | Whittlesey et al. |
| 7,312,766 B1 | 12/2007 | Edwards |
| 7,312,785 B2 * | 12/2007 | Tsuk et al. ................... 345/156 |
| 7,344,508 B2 | 3/2008 | Surina |
| 7,348,967 B2 | 3/2008 | Zadesky et al. |
| 7,359,624 B2 | 4/2008 | Adams et al. |
| 7,373,820 B1 | 5/2008 | James |
| 2002/0008635 A1 | 1/2002 | Ewing et al. |
| 2002/0016786 A1 | 2/2002 | Pitkow et al. |
| 2002/0054060 A1 | 5/2002 | Schena |
| 2002/0078045 A1 | 6/2002 | Dutta |
| 2002/0116476 A1 | 8/2002 | Eyal et al. |
| 2002/0133418 A1 | 9/2002 | Hammond et al. |
| 2002/0142701 A1 | 10/2002 | Rosenberg |
| 2002/0152077 A1 | 10/2002 | Patterson |
| 2002/0186221 A1 | 12/2002 | Bell |
| 2003/0009497 A1 | 1/2003 | Yu |
| 2003/0033287 A1 | 2/2003 | Shanahan et al. |
| 2003/0041105 A1 | 2/2003 | Patrick |
| 2003/0047683 A1 | 3/2003 | Kaushal |
| 2003/0069077 A1 | 4/2003 | Korienek |
| 2003/0076301 A1 | 4/2003 | Tsuk et al. |
| 2003/0089218 A1 * | 5/2003 | Gang et al. .................... 84/615 |
| 2003/0110038 A1 | 6/2003 | Sharma |
| 2003/0115193 A1 | 6/2003 | Okamoto et al. |
| 2003/0135490 A1 | 7/2003 | Barrett et al. |
| 2003/0187837 A1 | 10/2003 | Cutliss |
| 2003/0195884 A1 | 10/2003 | Boyd et al. |
| 2003/0220917 A1 | 11/2003 | Copperman et al. |
| 2003/0236582 A1 * | 12/2003 | Zamir et al. ................... 700/94 |
| 2004/0015714 A1 | 1/2004 | Abraham et al. |
| 2004/0017482 A1 | 1/2004 | Weitman |
| 2004/0019588 A1 | 1/2004 | Doganata et al. |
| 2004/0068486 A1 | 4/2004 | Chidlovskii |
| 2004/0097806 A1 | 5/2004 | Hunter |
| 2004/0103087 A1 | 5/2004 | Mukherjee et al. |
| 2004/0124248 A1 | 7/2004 | Selker |
| 2004/0164971 A1 | 8/2004 | Hayward |
| 2004/0166937 A1 | 8/2004 | Rothschild |
| 2004/0186824 A1 | 9/2004 | Delic et al. |
| 2004/0204240 A1 | 10/2004 | Barney |
| 2004/0224638 A1 | 11/2004 | Fadell et al. |
| 2004/0225519 A1 * | 11/2004 | Martin .......................... 705/1 |
| 2004/0252397 A1 | 12/2004 | Hodge et al. |
| 2005/0021470 A1 | 1/2005 | Martin et al. |
| 2005/0039206 A1 | 2/2005 | Opdycke |
| 2005/0071328 A1 | 3/2005 | Lawrence et al. |
| 2005/0080786 A1 | 4/2005 | Fish |
| 2005/0096047 A1 | 5/2005 | Haberman et al. |
| 2005/0107218 A1 | 5/2005 | Chuang et al. |
| 2005/0107688 A1 | 5/2005 | Strommer |
| 2005/0130802 A1 | 6/2005 | Kinnunen et al. |
| 2005/0139660 A1 | 6/2005 | Maxymych et al. |
| 2005/0143173 A1 | 6/2005 | Barney et al. |
| 2005/0149213 A1 | 7/2005 | Guzak et al. |
| 2005/0149499 A1 | 7/2005 | Franz et al. |
| 2005/0154636 A1 | 7/2005 | Hildinger et al. |
| 2005/0174975 A1 | 8/2005 | Mgrdechian et al. |
| 2005/0197237 A1 | 9/2005 | Chen |
| 2005/0210419 A1 | 9/2005 | Kela et al. |
| 2005/0212749 A1 | 9/2005 | Marvit et al. |
| 2005/0222981 A1 | 10/2005 | Lawrence et al. |
| 2005/0222989 A1 * | 10/2005 | Haveliwala et al. ............ 707/3 |
| 2005/0233859 A1 | 10/2005 | Takai et al. |
| 2005/0233861 A1 | 10/2005 | Hickman et al. |
| 2005/0251576 A1 | 11/2005 | Weel |
| 2005/0266961 A1 | 12/2005 | Shum et al. |
| 2005/0278317 A1 | 12/2005 | Gross et al. |
| 2005/0286546 A1 | 12/2005 | Basseli et al. |
| 2006/0017692 A1 * | 1/2006 | Wehrenberg et al. ........ 700/302 |
| 2006/0020177 A1 | 1/2006 | Seo et al. |
| 2006/0022955 A1 | 2/2006 | Kennedy |
| 2006/0026521 A1 | 2/2006 | Hotelling et al. |
| 2006/0095412 A1 | 5/2006 | Zito et al. |
| 2006/0097991 A1 | 5/2006 | Hotelling et al. |
| 2006/0098772 A1 | 5/2006 | Reho et al. |
| 2006/0101377 A1 | 5/2006 | Toyama et al. |
| 2006/0107822 A1 * | 5/2006 | Bowen ........................ 84/612 |
| 2006/0111621 A1 | 5/2006 | Coppi et al. |
| 2006/0136173 A1 * | 6/2006 | Case et al. ................... 702/182 |
| 2006/0161621 A1 | 7/2006 | Rosenberg |
| 2006/0167576 A1 | 7/2006 | Rosenberg |
| 2006/0167943 A1 | 7/2006 | Rosenberg |
| 2006/0173828 A1 | 8/2006 | Rosenberg |
| 2006/0173837 A1 | 8/2006 | Berstis et al. |
| 2006/0188109 A1 * | 8/2006 | Makino et al. ................ 381/86 |
| 2006/0189386 A1 | 8/2006 | Rosenberg |
| 2006/0195361 A1 | 8/2006 | Rosenberg |
| 2006/0229163 A1 | 10/2006 | Waters |
| 2006/0253210 A1 | 11/2006 | Rosenberg |
| 2007/0021269 A1 | 1/2007 | Shum |
| 2007/0044641 A1 * | 3/2007 | McKinney et al. ............ 84/612 |
| 2007/0067294 A1 | 3/2007 | Ward et al. |
| 2007/0125852 A1 | 6/2007 | Rosenberg |
| 2007/0135264 A1 | 6/2007 | Rosenberg |
| 2007/0156676 A1 | 7/2007 | Rosenberg |
| 2007/0156677 A1 | 7/2007 | Szabo |
| 2007/0173377 A1 | 7/2007 | Jamsen et al. |
| 2007/0271228 A1 | 11/2007 | Querel |
| 2008/0005075 A1 | 1/2008 | Horvitz et al. |
| 2008/0016040 A1 | 1/2008 | Jones et al. |
| 2008/0016218 A1 | 1/2008 | Jones et al. |

FOREIGN PATENT DOCUMENTS

| | | |
|---|---|---|
| WO | WO-02073818 | 9/2002 |

| WO | WO2006086439 | 8/2006 |

OTHER PUBLICATIONS

"Sound-Source Recognition: A Theory and Computational Model," by Keith Dana Martin, 1999 doctoral dissertation from MIT.
"MPEG-7 Sound-Recognition Tools," by Michael Casey in the IEEE Transactions On Circuits And Systems For Video Technology, vol. 11, No. 6, Jun. 2001.
"Deviations from the resonance theory of tempo induction," published at the Conference on Interdisciplinary Musicology, by Martin McKinney and Dirk Moelands 2004.
Extracting The Perceptual Tempo From Music by McKinney and Moelands, published at ISMIR 2004 5th International Conference on Music Information Retrieval 2004.
Rosenberg, "U.S. Appl. No. 11/610,615", filed Dec. 14, 2006.
Rosenberg, "U.S. Appl. No. 11/267,079", filed Nov. 3, 2005.
"Dialogr", http://www.dialogr.com/PostThought.cfm?/TopicId=684, first printed May 22, 2007.
Rosenberg, "U.S. Appl. No. 11/535,417", filed Sep. 26, 2006.
Murray, et al., "Underwater Teleroboticsa and Virtual Reality: A New Partnership", *NCCOSC RDT&E Division;* Jun. 20, 1996; pp. 1-10; San Diego, CA, (Jun. 20, 1996), 1-10.
Rosenberg, "U.S. Appl. No. 11/344,613", filed Jan. 31, 2006.
Rosenberg, "U.S. Appl. No. 11/682,874", filed Mar. 6, 2007.
Rosenberg, "U.S. Appl. No. 11/278,531", filed Apr. 3, 2006.
Rosenberg, "U.S. Appl. No. 11/697,704", filed Apr. 6, 2007.
Sharper Image, "Laser Baseball", *Item #PS115; downloaded from* www.sharperimage.com on Dec. 9, 2005, 18 pages, (Dec. 9, 2005), 18 pages.
Rosenberg, "U.S. Appl. No. 11/298,434", filed Dec. 9, 2005.
Rosenberg, "U.S. Appl. No. 11/427,320", filed Jun. 28, 2006.
Rosenberg, "U.S. Appl. No. 11/626,355", filed Jan. 23, 2007.
Rosenberg, "U.S. Appl. No. 11/610,615", filed May 10, 2007.
Rosenberg, "U.S. Appl. No. 11/677,045", filed Feb. 20, 2007.
Rosenberg, "U.S. Appl. No. 11/619,605", filed Jan. 3, 2007.
Rosenberg, "U.S. Appl. No. 11/610,494", filed Dec. 13, 2006.
Rosenberg, "U.S. Appl. No. 11/562,036", filed Nov. 21, 2006.
Rosenberg, "U.S. Appl. No. 11/282,379", filed Aug. 17, 2006.
Rosenberg, "U.S. Appl. No. 11/260,000", filed Oct. 26, 2005.
Rosenberg, "U.S. Appl. No. 11/299,096", filed Dec. 9, 2005.
Rosenberg, "U.S. Appl. No. 11/315,762", filed Dec. 21, 2005.
Rosenberg, "U.S. Appl. No. 11/341,025", filed Jan. 27, 2006.
Rosenberg, "U.S. Appl. No. 11/383,195", filed Aug. 10, 2006.
Rosenberg, "U.S. Appl. No. 11/422,065", filed Aug. 24, 2006.
Rosenberg, "U.S. Appl. No. 11/425,981", filed Jun. 22, 2007.
Rosenberg, "U.S. Appl. No. 11/428,341", filed Oct. 12, 2006.
Wu and Childers, "Gender Recognition from Speech Part I: Coarse Analysis", (1991).
Wu and Childers, "Gender Recognition from Speech Part II: Fine Analysis", (1991).
Brin and Page, "The Anatomy of a Large-Scale Hypertextual Search Engine", *Stanford University*, 1998.
Hayashi, J et al., "A Method for Estimating and Modeling Age and Gender Using Facial Image Processing", (2001).
Schotz, "Automatic prediction of speaker age using CART", (2003).
Castrillon, et al., "Identity and Gender Recognition Using the ENCARA Real-Time Face Detector", *CAEPIA*, (Nov. 2003).
"www.wwmx.org", First visited in May 2005.
Office Action from U.S. Appl. No. 11/282,379, filed Sep. 18, 2007.
Kornbluh, et al., "High-field Electrostriction of Elastomeric Polymer Dielectrics for Actuation", *SPIE Conference on Electroactive Polymer Actuators and Devices*, (Mar. 1999).
Kawahara, et al., "Designing a Universal Remote Control for the Ubiquitous Computing Environment", *EE Times*, 2003.
Abrial, et al., "A New Contactless Smartcard IC Using an On-Chip Antenna and an Asynchronous Micro-controller", (2001).
Rosenberg, "U.S. Appl. No. 11/341,100", filed Jan. 27, 2006.
Rosenberg, "U.S. Appl. No. 11/278,120", filed Oct. 5, 2006.
Morhring, et al., "Video See-Through AR on Consumer Cell-Phones", (Mar. 2004).
Gordon, et al., "Silicon Optical Navigation", (2003).

"Remotely Operated Vehicles Seaeye Falcon", www.roperresources.com, (May 2002).
"Remotely Operated Vehicle", www.seabotix.com/products/lbv150.htm, (Dec. 2001).
"Unmanned Aircraft Systems", www.baiaerosystems.com, (1985).
"www.gesturetek.com", (Jul. 1996).
"www.reactrix.com", (2002).
Office Action from U.S. Appl. No. 11/422,065, filed Mar. 28, 2007.
Office Action from U.S. Appl. No. 11/422,065, filed Aug. 31, 2007.
Rosenberg, "U.S. Appl. No. 11/749,134", filed May 15, 2007.
Rosenberg, "U.S. Appl. No. 11/749,137", filed May 15, 2007.
Rosenberg, "U.S. Appl. No. 11/298,797", filed Aug. 3, 2006.
Rosenberg, "U.S. Appl. No. 11/341,021", filed Aug. 3, 2006.
Rosenberg, "U.S. Appl. No. 11/383,197", filed Aug. 31, 2006.
Reinhold, Ross "Applications of Myers-Briggs Type Indicator, Personality Type", available at http://www.personalitypathways.com/ last visited Jun. 15, 2007.
"Human Metrics: Jung Typology Test", *available at*: http://www.humanmetrics.com/cgi-win/JTypes2.asp last visited Jun. 15, 2007.
Rosenberg, "U.S. Appl. No. 11/246,050", filed Feb. 8, 2007.
Rosenberg, "U.S. Appl. No. 11/762,017", filed Oct. 4, 2007.
Rosenberg, "U.S. Appl. No. 11/772,803", filed Jul. 12, 2007.
Rosenberg, "U.S. Appl. No. 11/846,530", filed Aug. 29, 2007.
Rosenberg, "U.S. Appl. No. 11/851,340", filed Sep. 6, 2007.
Rosenberg, "U.S. Appl. No. 11/841,868", filed Aug. 20, 2007.
Rosenberg, "U.S. Appl. No. 11/461,375", filed Nov. 9, 2006.
Rosenberg, "U.S. Appl. No. 11/555,784", filed May 24, 2007.
Rosenberg, "U.S. Appl. No. 11/563,610", filed Jun. 28, 2007.
Rosenberg, "U.S. Appl. No. 11/697,706", filed Aug. 16, 2007.
Rosenberg, "U.S. Appl. No. 11/618,858", filed Jun. 14, 2007.
Rosenberg, "U.S. Appl. No. 11/676,298", filed Jul. 5, 2007.
Rosenberg, "U.S. Appl. No. 11/697,732", filed Apr. 8, 2007.
Rosenberg, "U.S. Appl. No. 11/744,879", filed Sep. 20, 2007.
"Bodybug Calorie Management System", *downloaded from* www.ubergizmo.com/15/archives/2005/03/boddybug_calori.html on Jul. 9, 2007, (Mar. 18, 2005).
"www.fitlinxx.com", *downloaded from* www.fitlinxx.com/brand/about_tour3.htm on Jul. 9, 2007, (2003).
"YMCA", *downloaded from* www.ymcamidpen.org/textpage.php?b=2&p=fitlinxx on Jul. 10, 2007, (2003).
DeMartini, Marilyn "Cyber Fitness", *downloaded from* www.physicalmag.com/articlesTemp.as?dept=14&articleID=1812 on Jul. 10, 2007, (Feb. 18, 2001).
Munro, Aria "eNewsChannels", *downloaded from* enewschannels.com/20070106enc582-025321.php on Aug. 5, 2007, (Jul. 1, 2007).
Oliver, Nuria et al., "Enhancing Exercise Performance through Real-time Phsiological Monitoring and Music: A User Study", *Proceedings of Pervasive Health 2006.* Innsbruck, Austria. Nov. 2006, et all=Lucas Kreger-Stckles.
Betlyon, Jim "Omni Fitness Equipment Stores Integrate Physical Genius Online Fitness Tools", *downloaded from* www.physicalgenius.com on Aug. 5, 2007, (Apr. 19, 2000).
McKinney and Moelants, "Extracting the Perceptual Tempo from Music", *published at the ISMIR 2004 5th International Conference on Music Information Retrieval.*
"PCDJ Red Virtual Rack Module", by Visiosonic of Clearwater, FL. *Downloaded from* www.visiosonic.com on Jun. 27, 2006.
"Beat rates per minute", *downloaded from* www.bpmlist.com on Jun. 27, 2006. *Lulu Publishing. ISBN 1-4116-4211-2.*
Metzger, Christian et al., "FreeDigiter: A Contact-free Device for Gesture Control", *IEEE 8th International Symposium on Wearable Computers*, (Nov. 4, 2004).
"Tune Your Run", *Apple Computer/Nike, downloaded from* www.apple.com on Jun. 28, 2006.
Nintendo, "Kirby's Tilt N' Tumble", *downloaded from* www.nintendo.com; Nov. 14, 2006; 2 pages.
Cook, Perry et al., "Using DSP-Based Parametric Physical Syntheses Models to Study Human Sound Perception", *2003 IEEE Workshop on Applications of Signal Processing to Audio and Acoustics.*
"Yahoo media player", *downloaded from* www.yahoo.com on Sep. 19, 2006. Not admitted as prior art.
Rosenberg, "U.S. Appl. No. 11/775,314", filed Jul. 30, 2007.
Office Action from U.S. Appl. No. 11/298,797, filed Jan. 9, 2008.

"Jukebox Without Quarters", *Business Opportunities Weblog,* http://www.business-opportunities.bix/2007/03/30/jukebox-without-quarters/, cited Mar. 30, 2007, printed May 22, 2007, (May 30, 2007),2 pages.
Rosenberg, "U.S. Appl. No. 11/551,702", filed Oct. 20, 2006.
Rosenberg, "U.S. Appl. No. 11/285,534", filed Nov. 22, 2005.
Rosenberg, "U.S. Appl. No. 11/533,037", filed Sep. 19, 2006.
Rosenberg, "U.S. Appl. No. 11/749,134", filed May 15, 2007.
Rosenberg, Louis "Virtual Fixtures: perceptual Overlays Enchance Operator Performance in Telepresence Tasks", *Ph.D. Dissertation, Stanford University,* (Jun. 1994).
Rosenberg, Louis "A force Feedback Programming Primer", *Immersion Corporation,* (1997).
"www.confluence.org", *first visited* May 2005.
Rosenberg, "U.S. Appl. No. 11/772,808", filed Jul. 2, 2007.
Rosenberg, "U.S. Appl. No. 11/223,368", filed Sep. 9, 2005.
Shahinpoor, Mohsen "Electro-mechanics of ionoelastic beams as electrically-controllable artificial muscles", *SPIE Conference on Electroactive Polymer Actuators and Devices, SPEE* vol. 3669, 1999.
Rosenberg, "U.S. Appl. No. 11/427,325", filed Jun. 28, 2006.
Rosenberg, "U.S. Appl. No. 11/610,499", filed Dec. 13, 2006.
Rosenberg, "U.S. Appl. No. 11/315,755", filed Dec. 21, 2005.
Rosenberg, "U.S. Appl. No. 11/344,612", filed Nov. 16, 2006.
Rosenberg, "U.S. Appl. No. 11/344,701", filed Jan. 31, 2006.
Rosenberg, "U.S. Appl. No. 11/425,990", filed Jun. 22, 2006.
Spohrer, "Information in Places", *IBM Systems Journal;* 1999; pp. 602-628; vol. 38, No. 4.
Rosenberg, "U.S. Appl. No. 11/619,607", filed Jan. 3, 2007.
Rosenberg, "U.S. Appl. No. 11/341,948", filed Jan. 27, 2006.
Rosenberg, "U.S. Appl. No. 11/683,394", filed Mar. 7, 2007.
Oguro, K et al., "Polymer Electrolyte Actuator with Gold Electrodes", *SPIE Conference on Electroactive Polymer Actuators and Devices, SPEE* vol. 3669, 1999.
Lumia, R et al., "Microgripper design using electo-active polymers", *SPIE Conference on Electroactive Polymer Actuators and Devices, SPEE* vol. 3669, 1999, (Mar. 1999).
Rosenberg, "U.S. Appl. No. 11/561,981", filed Nov. 21, 2006.
Rosenberg, "U.S. Appl. No. 11/223,368", filed Sep. 9, 2005.
Rosenberg, "U.S. Appl. No. 11/539,598", filed Oct. 6, 2006.
Rosenberg, "U.S. Appl. No. 11/267,079", filed Nov. 3, 2005.
Rosenberg, "U.S. Appl. No. 11/285,534", filed Nov. 22, 2005.
Rosenberg, "U.S. Appl. No. 11/533,037", filed Sep. 19, 2006.
Rosenberg, "U.S. Appl. No. 11/749,134", filed May 15, 2007.
Rosenberg, "U.S. Appl. No. 11/610,615", filed Dec. 14, 2009.
"Beat rates per minute", *downloaded from* www.bpmlist.com on Jun. 27, 2006. *Lulu Publishing.* ISBN 1-4116-4211-2.
"Bodybug Calorie Management System", *downloaded from* www.ubergizmo.com/15/archives/2005/03/boddybug_calori.html on Jul. 9, 2007, Mar. 18, 2005.
"Dialogr", http://www.dialogr.com/PostThought.cfm?/TopicId=684, *first printed* May 22, 2007.
"Human Metrics: Jung Typology Test", *available at*: http://www.humanmetrics.com/cgi-win/JTypes2.asp *last visited* Jun. 15, 2007.
"Jukebox Without Quarters", *Business Opportunities Weblog,* http://www.business-opportunities.bix/2007/03/30/jukebox-without-quarters/ cited Mar. 30, 2007, printed May 22, 2007, May 30, 2007, 2 pages.
"PCDJ Red Virtual Rack Module", by Visiosonic of Clearwater, FL. *Downloaded from* www.visiosonic.com on Jun. 27, 2006.
"Remotely Operated Vehicle", www.seabotix.com/products/lbv150.htm Dec. 2001.
"Remotely Operated Vehicles Seaeye Falcon", www.roperresources.com May 2002.
"Total Immersion", *D'FUSION Software,* 2004.
"Tune Your Run", *Apple Computer/Nike, downloaded from* www.apple.com on Jun. 28, 2006.
"Unmanned Aircraft Systems", www.baiaerosystems.com 1985.
"www.confluence.org", *first visited* May 2005.
"www.fitlinxx.com", *downloaded from* www.fitlinxx.com/brand/about_tour3.htm on Jul. 9, 2007 2003.
"www.gesturetek.com", Jul. 1996.
"www.reactrix.com", 2002.
"www.wwmx.org", *First visited in* May 2005.
"Yahoo media player", *downloaded from* www.yahoo.com on Sep. 19, 2006. *Not admitted as prior art.*
"YMCA", *downloaded from* www.ymcamidpen.org/textpage.php?b=2&p=fitlinxx *on* Jul. 10, 2007 2003.
Abrial, et al., "A New Contactless Smartcard IC Using an On-Chip Antenna and an Asynchronous Micro-controller", 2001.
Anonymous, "Social Search", Wikipedia.com Jan. 23, 2008.
Betlyon, Jim, "Omni Fitness Equipment Stores Integrate Physical Genius Online Fitness Tools" , *downloaded from* www.physicalgenius.com on Aug. 5, 2007 Apr. 19, 2000.
Brin and Page, ,"The Anatomy of a Large-Scale Hypertextual Search Engine", *Stanford University,* 1998.
Castrillon, et al., "Identity and Gender Recognition Using the ENCARA Real-Time Face Detector", *CAEPIA* Nov. 2003.
Ciger, et al., "The magic wand", *In: Proceedings of Spring Conference on Computer Graphics* 2003, Budmerice, Slovak Republic, 132-8.
Cook, Perry et al., "Using DSP-Based Parametric Physical Syntheses Models to Study Human Sound Perception", *2003 IEEE Workshop on Applications of Signal Processing to Audio and Acoustics.*
DeMartini, Marilyn, "Cyber Fitness", *downloaded from* www.physicalmag.com/articlesTemp.as?dept=14&articleID=1812 on Jul. 10, 2007 Feb. 18, 2001.
Finkelstein, Lev, "Placing Search in Context: The Concept Revisted", *Zapper Technologies* May 5, 2001.
Gordon, et al., "Silicon Optical Navigation", 2003.
Hayashi, J et al., "A Method for Estimating and Modeling Age and Gender Using Facial Image Processing", 2001.
Hernandez, Jose L. et al., "A New Instrumented Approach For Translating American Sign Language Into Sound And Text", *IEEE International Conference on Face and Gesture Recognition* 2004, Seoul, Korea, May 2004.
Hernandez-Rebollar, et al., "A Multi-Class Pattern Recognition System for Practical Finger Spelling Translation", *Proceedings of International Conference on Multimodal Interfaces, IEEE 2002,* 185-190.
Kawahara, et al., "Designing a Universal Remote Control for the Ubiquitous Computing Environment", *EE Times,* 2003.
Kornbluh, et al., "High-field Electrostriction of Elastomeric Polymer Dielectrics for Actuation", *SPIE Conference on Electroactive Polymer Actuators and Devices* Mar. 1999.
Kramer, J. et al., "The Talking Glove: Expressive and Receptive Verbal Communication Aid for the Deaf, Deaf-Blind, and Nonvocal", *SIGCAPH 39* Spring 1988, 12-15.
Lumia, R et al., "Microgripper design using electo-active polymers", *SPIE Conference on Electroactive Polymer Actuators and Devices, SPEE* vol. 3669, 1999 Mar. 1999.
McKinney and Moelants, "Extracting the Perceptual Tempo from Music", *published at the ISMIR 2004 5th International Conference on Music Information Retrieval* 2004.
Metzger, Christian et al., "FreeDigiter: A Contact-free Device for Gesture Control", *IEEE 8th International Symposium on Wearable Computers* Nov. 4, 2004.
Morhring, et al., "Video See-Through AR con Consumer Cell-Phones", Mar. 2004.
Munro, Aria, "eNewsChannels", *downloaded from* enewschannels.com/20070106enc582-025321.php on Aug. 5, 2007, Jul. 1, 2007.
Murray, et al., "Underwater Teleroboticsa and Virtual Reality: A New Partnership", *NCCOSC RDT&E Division;* Jun. 20, 1996; pp. 1-10; San Diego, CA, 1-10.
Nintendo, ,"Kirby's Tilt N' Tumble", *downloaded from* www.nintnedo.com; Nov. 14, 2006; 2 pages.
Oguro, K et al., "Polymer Electrolyte Actuator with Gold Electrodes", *SPIE Conference on Electroactive Polymer Actuators and Devices, SPEE* vol. 3669, 1999.
Oliver, Nuria et al., "Enhancing Exercise Performance through Real-time Phsiological Monitoring and Music: A User Study", *Proceedings of Pervasive Health* 2006. Innsbruck, Austria. Nov. 2006 et all = Lucas Kreger-Stckles.
Reinhold, Ross, "Applications of Myers-Briggs Type Indicator, Personality Type", *available at* http://www.personalitypathways.com/ last visited Jun. 15, 2007.
Rosenberg, Louis, "A force Feedback Programming Primer", *Immersion Corporation* 1997.

Rosenberg, Louis, "Virtual Fixtures: perceptual Overlays Enchance Operator Performance in Telepresence Tasks", *Ph.D. Dissertation, Stanford University* Jun. 1994.

Schotz, ,"Automatic prediction of speaker age using CART", 2003.

Shahinpoor, Mohsen, "Electro-mechanics of ionoelastic beams as electrically-controllable artificial muscles", *SPIE Conference on Electroactive Polymer Actuators and Devices, SPEE* vol. 3669, 1999.

Sharper Image, "Laser Baseball", *Item #PS115; downloaded from* www.sharperimage.com on Dec. 9, 2005, 18 pages.

Spohrer, ,"Information in Places", *IBM Systems Journal*; 1999, pp. 602-628; vol. 38, No. 4.

Sullivan, Danny, "Eurekster Launches Personalized Social Search", SearchEngineWatch.com Online Newsletter Jan. 24, 2004.

Wu and Childers, ,"Gender Recognition from Speech Part I: Coarse Analysis", 1991.

Wu and Childers, ,"Gender Recognition from Speech Part II: Fine Analysis", 1991.

\* cited by examiner

SYSTEM, METHOD AND COMPUTER PROGRAM PRODUCT FOR AUTOMATICALLY SELECTING, SUGGESTING AND PLAYING MUSIC MEDIA FILES

CROSS-REFERENCE TO RELATED APPLICATIONS

This application is a non-provisional application claiming benefit and priority under 35 U.S.C. § 119(e) from applicant's U.S. provisional applications Ser. No. 60/648,197, filed on Jan. 27, 2005 and Ser. No. 60/665,291 filed on Mar. 26, 2005, to the instant inventor; the aforementioned provisional applications are hereby incorporated by reference in their entirety.

FEDERALLY SPONSORED RESEARCH AND DEVELOPMENT

Not Applicable

REFERENCE TO A MICROFICHE APPENDIX

Not Applicable

FIELD OF INVENTION

The present invention relates generally to automated arrangement music media file selection, and more specifically to a system, method and computer program product for automatically selecting, suggesting and/or playing of a music media file in dependence on behavioral information and one or signal inputs.

BACKGROUND

Electronic Media Players have become popular personal entertainment devices due to their highly portable nature and interconnectivity with existing computer networks, for example the Internet. The accessibility and simplicity in downloading music and other electronic media continues to fuel the popularity of these devices as is exemplified by Apple Computer, Inc.'s highly successful iPod™ portable media player. Other manufacturers have competing Media Players offering various functionalities and file playing compatibilities in an effort to differentiate their products in the marketplace.

As discussed in Apple Computer, Inc., patent application, US 2004/0224638 A1, Ser. No. 10/423,490 to Fadell, et al., which is herein incorporated by reference in its entirety; an increasing number of consumer products are incorporating circuitry to play musical media files and other electronic media.

For example, many portable electronic devices such as cellular telephones and personal digital assistants (PDAs) include the ability to play electronic musical media in many of the most commonly available file formats including MP3, AVI, WAV, MPG, QT, WMA, AIFF, AU, RAM, RA, MOV, MIDI, etc.

In the relevant art, portable media players lack the ability to correlate a user's activities, schedules, locations, motions, physiological and psychological states to select, suggest and/or automatically play a music media file to enhance the user's listening experience. Users are therefore reliant on manual selections, a preestablished play list(s) or musical selections of others which do not take into account the many variables that affect a user's musical listening preferences. For example, a user's musical listening preferences are highly variable based on the user's mood, scheduled events, current activity, seasonal changes, weather conditions, user listening preferences, physiological state, physiological state, locale and other variables which impact a user's musical preferences.

Therefore, a predictive mechanism that automatically performs musical selection, suggestion and/or playing is a highly desirable feature for incorporation into portable media players available in the relevant art.

SUMMARY

The invention as described herein addresses the need in the relevant art and provides a predictive mechanism that automatically performs musical selection, suggestion and/or playing for incorporation into portable media players. Various embodiments of the present invention perform predictive musical selection, suggestion, and/or playing by storing data over a period of time indicative of how a user's musical choices correlate with chronographic information and/or sensor information, and/or using the stored data along with current chronographic information and/or current sensor data to predicatively select, suggest, and/or play a current musical selection to the user that has an increased likelihood of matching the users then current musical preferences.

An underlying premise of the current invention assumes a user's personal preference in music at any particular moment may be influenced by one or more current conditions of the user and/or the user's environment referred to herein as ambient factors. In a first example of an ambient factor; a current time of day, day of week, and season of the year are all chronographic ambient factors that may affect a user's song preference inclinations at a given moment. In a second example of an ambient factor; a current air temperature, cloud conditions, precipitation conditions, sun conditions, smog conditions, pollen count, UV index, and barometric pressure are all meteorological ambient factors that may affect a user's song preference inclinations at a given moment.

In third example of an ambient factor; a user's current geographic location, speed of motion, direction of motion, elapsed time spent at rest, elapsed time spent in motion, orientation, inclination, and/or route of travel may be considered geo-spatial ambient factors that may affect a user's song preference inclinations at a given moment. In a fourth example of an ambient factor; a user's current heart rate, respiration rate, pulse rate, and skin temperature are all physiological ambient factors that may affect a user's song preference inclinations at a given moment.

Lastly, in a fifth example of an ambient factor; a user's current activity such as walking the dog, exercising at the gym, working at the office, going out to lunch, relaxing at the beach, or going for a run, are all behavioral ambient factors that that may affect a user's song preference inclinations at a given moment.

In various embodiments of the present invention an automated music media file selection system, method and computer program product is provided that accumulates a store of information in a datastore that is programmed to correlate a particular user's historical music media file selection with one or more ambient factors present at the moment the user's music media file selections were made. The datastore is then interpreted to provide a predicted music media file selection in the future. The information contained in the datastore is referred to herein as ambient influence information because it represents how one or more ambient factors is likely to influence a particular user's future music media file selections.

In various embodiments of the present invention, the collection and interpretation of the collected ambient influence information along with correlations made with current chronographic information and/or current ambient factor data received from sensors is used to predicatively select, suggest, and/or play a current musical selection to the user that has an increased likelihood of correlating with the users then current musical preferences.

In various embodiments of the invention, the ambient influence information is further correlated with an accessible datastore of user schedule information and/or an accessible datastore of current meteorological information to further correlate the ambient factor data received from sensors each time the user expresses his or her musical selection to the system. In this way the present invention generates a datastore of correlations between chronographic information and/or sensor information and/or schedule information and/or meteorological information, with respect to a user's musical selection inclinations. This information is then stored in the ambient influence information datastore and includes one or more correlated chronographic, meteorological, geo-spatial, behavioral, and/or physiological ambient factors associated with the user.

In various embodiments of the present invention, the store of ambient influence information is also used along with current schedule information for the user and/or current meteorological data accessed over a network to predicatively select, suggest, and/or play a current musical selection to the user that has a greater likelihood of correlating with the users then current musical preferences.

As used herein current chronographic information and/or current sensor data is defined as data collected from time reference sources and/or sensors respectively that reflects real-time or near-real time ambient factors. Similarly current schedule information and/or current meteorological data is defined as data that reflects the real-time or near-real time scheduled activity of the user and/or real-time or near-real time meteorological conditions of the user's local environment respectively.

Stored chronographic information, sensor data, schedule information and/or meteorological data, is referred to herein as the ambient influence information associated with a user's historical musical selections. Thus the present invention can be described as a system, method and computer program product for collecting and correlating ambient influence information with current ambient factors to predicatively select, suggest, and/or play a current musical selection to the user that has a greater likelihood of being in agreement with a users current musical preferences. As will be described herein, an exemplary system, method and computer program product by which the present invention makes such predictive selections and/or suggestions utilizing a weighted randomization process.

In an exemplary systematic embodiment of the invention, a predictive music media selection system for a portable media player is disclosed. The exemplary systematic embodiment of the invention comprises; a processor; a main memory coupled to the processor; a communications infrastructure coupled to the processor; a secondary memory coupled to the communications infrastructure having retrievably stored therein;

a plurality of music media files playable by the processor and ambient influence information relationally associated with each of the plurality of music media files; an ambient factors providing circuit operatively coupled to the communications infrastructure; and at least one predictive program stored in at least a portion of the main memory having instructions executable by the processor to; select and suggest or automatically play at least one of the plurality of music media files retrieved from the secondary memory in at least partial dependence on a correlation assessment between one or more ambient factors and the ambient influence information.

Various exemplary systematic embodiments of the invention further includes instructions executable by the processor to; select and suggest or automatically play at least one of the plurality of music media files using a weighted random selection process; monitor and store a user's interactions with the portable media player in the ambient influence information; generate an array in another portion of the main memory; populate the array with unique indicia associated with each of the plurality of music media files; the indicia being weighted in the array according to the ambient influence information and at least one or more ambient factors; randomly select an element of the array; and retrieve at least one music media file using the unique indicia contained in the array element as an index; and, alter a tempo or to perform gait matching on a playing music media file in dependence on the sensor signals.

In a related exemplary systematic embodiment of the invention the ambient factors includes at least one of chronographic information, external downloadable information and sensor information. In another related exemplary systematic embodiment of the invention the sensor information includes at least one of; meteorological information, physiological information, geo-spatial information, motion information, and environmental information, and a combination thereof. In yet another related systematic embodiment of the invention the weighting is derived from a correlation between the ambient influence information and one or more of the ambient factors.

In yet another related exemplary systematic embodiment of the invention, the ambient influence information includes established relationships between the user's musical preferences, one or more ambient factors and/or chronographic information.

In an exemplary methodic embodiment of the invention, a method for predictive music media selection for a portable media player is provided which comprises; providing at least one predictive program operatively loaded into a main memory of the portable media player; monitoring user music media selections associated with a plurality music media files playable by the portable media player; monitoring ambient factors received by the portable media player; accumulating ambient factors and user interactions in an ambient influence information datastore; associating the ambient influence information with the plurality music media files; and determining correlated weighting factors in at least partial dependence on the ambient factors and ambient influence information contained in the datastore.

In a related exemplary methodic embodiment of the invention, the method further includes; generating an array in another portion of the main memory; populating the array with unique indicia associated with the plurality of music media files; the indicia being weighted in the array according to the correlated weighting factors; randomly selecting an element of the array; and retrieving at least one music media file using the unique indicia contained in the array element as an index. In another related exemplary methodic embodiment of the invention, the method further includes suggesting or automatically playing the at least one music media file. In yet another related exemplary methodic embodiment of the invention, the method further includes; altering a tempo or performing gait matching of a playing music media file in dependence on at least one of the ambient factors.

Various exemplary methodic embodiments of the invention describe how the weighting is derived from a correlation between the ambient factors and the ambient influence information; and how the ambient factors includes at least one of chronographic information, external downloadable information and sensor information.

In an exemplary computer program product embodiment of the invention, a computer program product is provided for use in a portable media player which is embodied in a tangible form having instructions executable by a processor to select and suggest or automatically play at least one music file from a plurality of music media files stored in datastore in dependence on a determined correlation between one or more ambient factors and accumulated ambient influence information.

Various exemplary computer product embodiments of the invention further includes instructions executable by the processor to monitor a user's interactions with the portable media player and the one or more ambient factors to determine the correlation; retrievably store the correlation in a relational association with the accumulated ambient influence information; alter a tempo or to perform gait matching of a playing music media file in dependence on the one or more ambient factors. In another related exemplary computer product embodiment of the invention the accumulated ambient influence information includes established relationships between a user's music preferences and archives of one or more ambient factors. In yet another related exemplary computer product embodiment of the invention the tangible form comprises magnetic media, optical media or logical media.

BRIEF DESCRIPTION OF DRAWINGS

The features and advantages of the invention will become apparent from the following detailed description when considered in conjunction with the accompanying drawings. Where possible, the same reference numerals and characters are used to denote like features, elements, components or portions of the invention. Optional components or feature are generally shown in dashed lines. It is intended that changes and modifications can be made to the described embodiment without departing from the true scope and spirit of the subject invention as defined in the claims.

DETAILED DESCRIPTION

The invention provides a system, method and computer program product which automatically selects, suggests and/or plays a music media file by collecting ambient influence information over a period of time and using such information along with current ambient factors to predicatively select, suggest, and/or play a current musical selection to the user.

Where necessary, computer programs and algorithms are envisioned to be programmed in a high level language object oriented language, for example Java™ C++, C#, or Visual Basic™.

Figure 1:
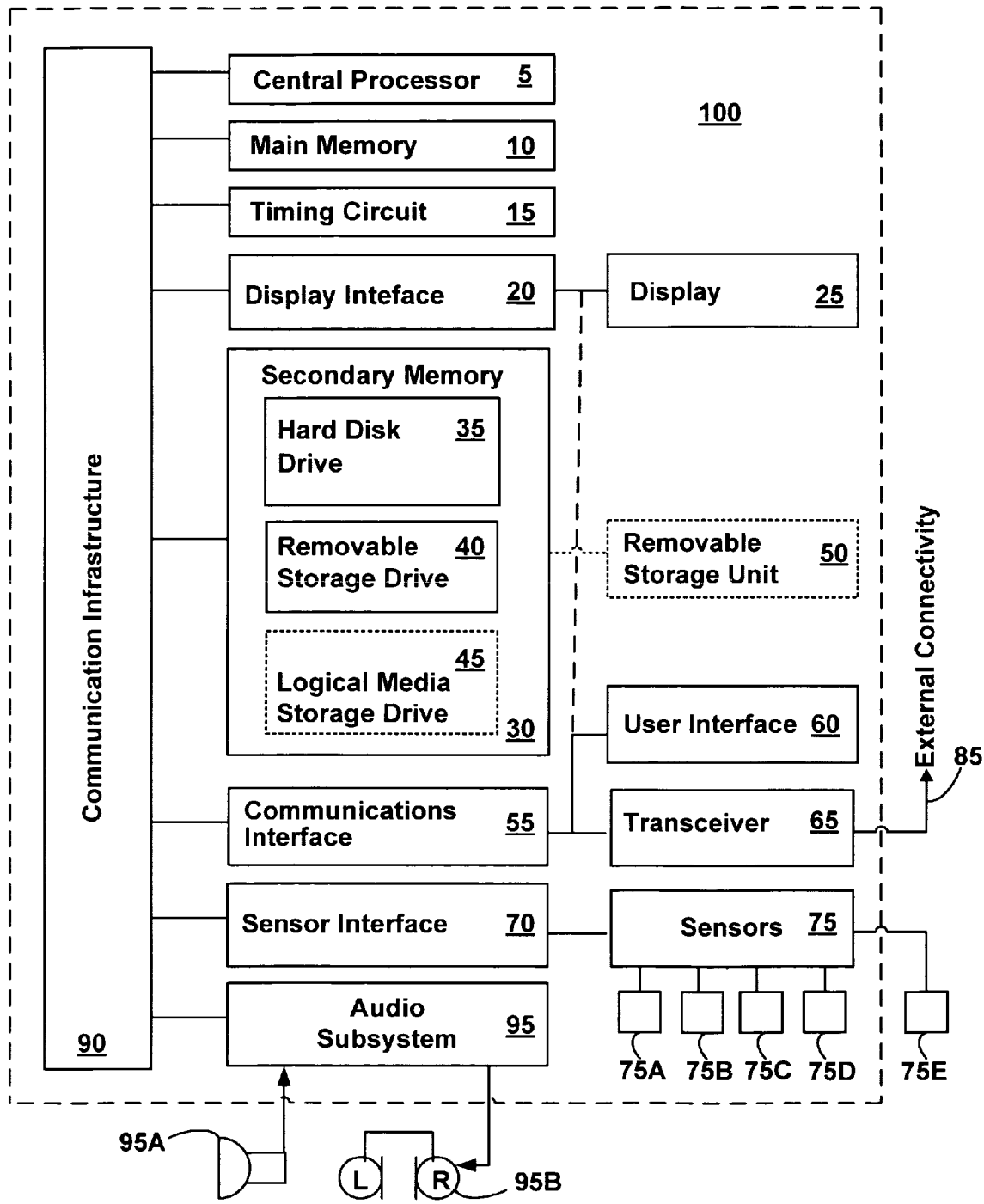
FIG. 1—depicts a generalized block diagram of a portable media player.

Referring to FIG. 1, a generalized block diagram of a media player 100 is depicted. The portable media player 100 includes a communications infrastructure 90 used to transfer data, memory addresses where data items are to be found and control signals among the various components and subsystems associated with the portable media player 100.

A central processor 5 is provided to interpret and execute logical instructions stored in the main memory 10. The main memory 10 is the primary general purpose storage area for instructions and data to be processed by the central processor 5. The main memory 10 is used in its broadest sense and includes RAM, EEPROM and ROM.

A timing circuit 15 is provided to coordinate activities within the portable media player in near real time. The central processor 5, main memory 10 and timing circuit 15 are directly coupled to the communications infrastructure 90.

A display interface 20 is provided to drive a display 25 associated with the portable media player 100. The display interface 20 is electrically coupled to the communications infrastructure 90 and provides signals to the display 25 for visually outputting both graphics and alphanumeric characters. The display interface 20 may include a dedicated graphics processor and memory to support the displaying of graphics intensive media. The display 25 may be of any type (e.g., cathode ray tube, gas plasma) but in most circumstances will usually be a solid state device such as liquid crystal display.

A secondary memory subsystem 30 is provided which houses retrievable storage units such as a hard disk drive 35, a removable storage drive 40, an optional logical media storage drive 45 and an optional removal storage unit 50. One skilled in the art will appreciate that the hard drive 35 may be replaced with flash memory.

The removable storage drive 40 may be a replaceable hard drive, optical media storage drive or a solid state flash RAM device. The logical media storage drive 45 may include a flash RAM device, an EEPROM encoded with playable media, or optical storage media (CD, DVD). The removable storage unit 50 may be logical, optical or of an electromechanical (hard disk) design.

A communications interface 55 subsystem is provided which allows for standardized electrical connection of peripheral devices to the communications infrastructure 90 including, serial, parallel, USB, and Firewire™ connectivity. For example, a user interface 60 and a transceiver 65 are electrically coupled to the communications infrastructure 90 via the communications interface 55. For purposes of this specification, the term user interface 60 includes the hardware and operating software by which a user interacts with the portable media player 100 and the means by which the portable media player conveys information to the user and may include the display 25.

The transceiver 65 facilitates the remote exchange of data and synchronizing signals between the portable media player 100 and other devices in processing communications 85 with the portable media player 100.

The transceiver 65 is envisioned to be of a radio frequency type normally associated with computer networks for example, wireless computer networks based on BlueTooth™ or the various IEEE standards 802.11$_x$, where x denotes the various present and evolving wireless computing standards or WiMax 802.16.

Alternately, digital cellular communications formats compatible with for example GSM, 3G and evolving cellular communications standards. Both peer-to-peer (PPP) and client-server models are envisioned for implementation of the invention. In a third alternative embodiment, the transceiver 65 may include hybrids of computer communications standards, cellular standards and evolving satellite radio standards.

The user interface 60 employed on the portable media play 100 may include a vibratory unit (not shown); a pointing device (not shown) such as a mouse, thumbwheel or track ball, an optional touch screen (not shown); one or more push-buttons (not shown); one or more sliding or circular rheostat controls (not shown) and one or more switches (not shown.) The user interface 60 provides interrupt signals to the processor 5 that may be used to interpret user interactions with the portable media player 100 and may be used in conjunction with the display 25. One skilled in the art will appreciate that the user interface devices which are not shown are well known and understood.

A sensor interface 70 is provided which allows one or more sensors 75 to be operatively coupled to the communications infrastructure 90. A portion of the sensors 75A, 75B, 75C, 75D may be installed within the case (not shown) housing the portable media player 100. Alternately, one or more sensors 75E may be peripheral to the portable media player 100 and coupled to the sensor interface 70 by an external jack or wireless arrangement which utilizes the transceiver 65.

A wide range of real time and near real time sensor types are envisioned to be connectable to the portable media player 100; examples of which includes meteorological sensors, physiological sensors, navigational sensors, geo-spatial sensors, motion sensors, inclination sensors, environmental sensors, and a combination thereof. References made to sensor data and/or external downloaded data such as schedule data and meteorological data may be used interchangeably herein with the term ambient factors.

These sensors provide the ambient factor data to the processor 5 via the sensor interface 70 coupled to the communications infrastructure 90. Lastly, an audio subsystem 85 is provided and electrically coupled to the communications infrastructure 95.

The audio subsystem provides for the playback and recording of digital media, for example, multi or multimedia encoded in any of the exemplary formats MP3, AVI, WAV, MPG, QT, WMA, AIFF, AU, RAM, RA, MOV, MIDI, etc. The audio subsystem includes a microphone input port 95A and a headphone or speaker output port 95B. Connection of the microphone 95A and/or headset 95B includes both traditional cable and wireless arrangements known in the art. As referred to in this specification, "media" refers to video, audio, streaming and any combination thereof.

In addition, the audio subsystem is envisioned to optionally include features such as graphic equalization, volume, balance, fading, base and treble controls, surround sound emulation, and noise reduction. One skilled in the art will appreciate that the above cited list of file formats is not intended to be all inclusive.

The portable media player 100 includes an operating system, the necessary hardware and software drivers necessary to fully utilize the devices coupled to the communications infrastructure, media playback and recording applications and at least one predictive program 240 (FIG. 2) operatively loaded into the main memory 10.

The at least one predictive program 240 (FIG. 2) is programmed to monitor behavioral aspects of music media file selection by a user along with the sensor data collected from the one or more of the sensors 75A, 75B, 75C, 75D, 75E and chronographic information received from one or more timing circuits 15 to determine correlations between a user's music media file selection preferences, sensor signals chronographic information and/or downloaded information to intelligently predict which music media files under a given set of circumstances (behavioral, chronographic and/or sensor dependent) will most likely be desired to be played by the user. References to the at least one predictive program 240 (FIG. 2) may be made in both singular and plural form. No limitation is intended by such grammatical usage as one skilled in the art will appreciate that multiple programs, objects, subprograms routines, algorithms, applets, contexts, etc. may be implemented programmatically to implement the various embodiments of the invention.

Optionally, the portable media player 100 is envisioned to include at least one remote authentication application, one or more cryptography applications capable of performing symmetric and asymmetric cryptographic functions, and secure messaging software (not shown.)

The present invention includes various distinct inventive arrangements that enable a portable media player to select, suggest and/or play a musical media that the user is more likely to be in the mood to listen to as compared to a music media file selected purely at random.

Various arrangements include storing ambient factors (for example sensor data) over a period of time indicative of how a user's past music media file selections were statistically correlated with chronographic, meteorological, geo-spatial, physiological, and/or behavioral ambient factors of the user at the time those choices were made, and by using the stored ambient influence information $AII_a$ 250A (FIG. 2) along with the current measure of chronographic, meteorological, geo-spatial, physiological, and/or behavioral ambient factors to select, suggest, and/or play a current musical media selection that the user has an increased likelihood of being in the mood to listen to.

More specifically, the various arrangements includes a data archival routine for collecting and storing chronographic information, sensor data, schedule data, and/or meteorological data each time the user expresses a musical selection or preference, relationally correlating this data with the musical selection or preference that was expressed, and a predictive musical media file selection routine which selects a particular music media file from a plurality of music media files stored in a datastore 260 (FIG. 2) located in the secondary memory 30. The selection of the music media file may be based in part based upon a current measure of chronographic information, sensor data, schedule data, and/or meteorological ambient factor data and one or more correlations of the current ambient factor data with stored ambient influence information.

Figure 2:
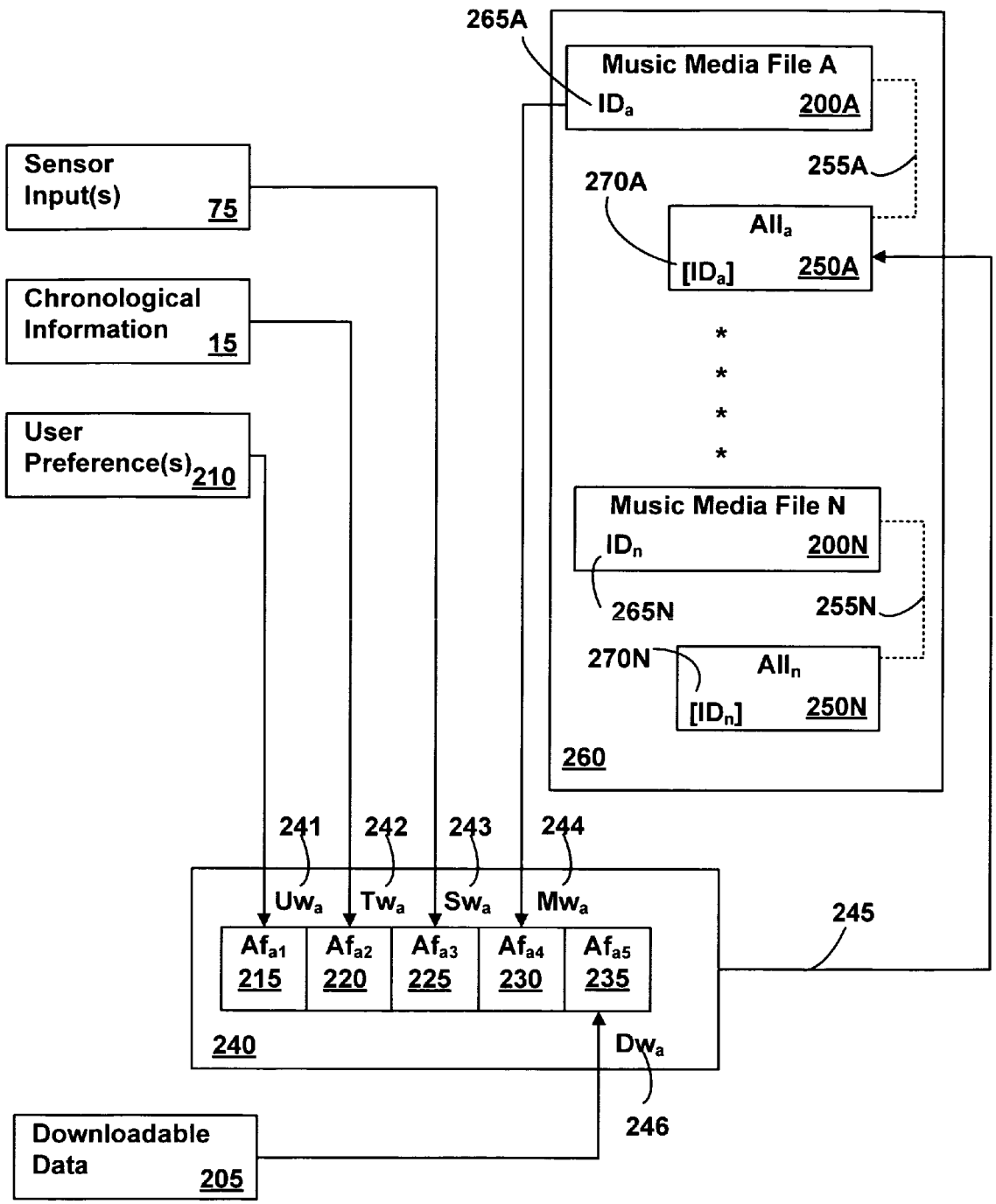
FIG. 2—depicts an embodiment of the invention in which a predictive application is accumulating ambient factors signals and other information for future music media file prediction.

Referring to a data storage routine of the present invention, FIG. 2 depicts an exemplary embodiment where the predictive program 240 has access to ambient factor sensor signals 75, chronological information 15, user preferences 210, and/or external downloadable data 205. As described previously, sensor signals 75 may provide data form one or more sensors including but not limited to air temperature sensors, skin temperature sensors, light-level sensors, pulse rate sensors, respiration rate sensors, GPS positioning sensors, accelerometer sensors, motion sensors, inclination sensors, noise level sensors, and/or a combination thereof. Chronological information 15 may include but is not limited to the current time of day (TOD), the current day of the week (DOW), the current month of the year (MOY), and/or the current season of the year (SOY).

User preferences 210 includes for example, a user's interactions and personal preferences associated with the portable media player 100, such as music media file selections, volume settings, display brightness settings, sound balance, etc., accomplished with the user interface 60.

External downloadable data 205 includes data accessed from an external source for example, user schedule data or meteorological data. Schedule data includes, for example, activities defined by the user such as "at work", "at the gym", "walk the dog", "relax at home", "do chores", "do gardening", "go running", "go cycling", "at the park", "at the beach", "grocery shopping", etc. Each activity represented by the schedule data is relationally associated with particular time(s) of day and/or particular day(s) of the week within the schedule data. Thus the schedule data can be used along with current time and/or date information to determine a current scheduled activity (i.e. a current behavioral ambient factor) of the user.

The schedule data for a particular user may be entered directly into the portable media player 100 through the user interface 60 of the portable media player 100 or can be created in a third party software application such as Microsoft Outlook™ and downloaded into the portable media player 100 as a schedule data file. Meteorological information for example, may include the current weather location of the user accessed from a weather service such as www.weather.com, which provides localized weather information. Based upon the user's current location (as determined by the user's zip code, GPS sensor information, or other locative information), current weather information can be accessed for the user's local region and provided to predictive program 240. The external downloadable data 205 may also include sunrise and sunset data for the user's current location and for the current date.

In this way, the downloaded meteorological data 205 can be used by the predictive program 240 along with current time and sensor data to determine the current sun conditions for the location of the user, sun conditions indicating for example if the sun has already come up in the morning, if the sun has already set in the evening, and/or if the sun is currently in the process of coming up and/or going down.

Having access to the sensor signals 75, chronological information 15, user preference data 210, and/or external downloadable data 205, the predictive program 240 is programmed to store ambient influence information $AII_a$ 250A in a file containing one or more of the ambient factors $AFa_1$ 215, $AFa_2$ 220, $AFa_3$ 225, $AFa_4$ 230, $AFa_5$ 235 that are present at a given time when the user expresses a music media file 200A selection.

For example, at a given time when the user selects a music media file 200A from a plurality of music media files 200N stored in a datastore 260 associated with the portable media player 100, the predictive program 240 receives an interrupt signal from the user interface 60 that the user has selected that particular music media file 200A and in response the predictive program 240 stores ambient influence information $AII_a$ 250A correlated with one or more ambient factors $AFa_1$ 215, $AFa_2$ 220, $AFa_3$ 225, $AFa_4$ 230, $AFa_5$ 235 received from sensor signals 75, chronological information 15, user preferences data 210, and/or downloadable external data 205 in an ambient influence information file $AII_a$ 250A located in the datastore 260.

The ambient influence information file $AII_a$ 250A is relationally 255A associated with the music media file 200A selected by the user. This relational association 255A is generally performed through the use of a unique music media file identifier ID 265A, 270A that is received by predictive program 240 as part of the selection process. In this way, the predictive program 240 stores the ambient factors $AFa_1$ 215, $AFa_2$ 220, $AFa_3$ 225, $AFa_4$ 230, $AFa_5$ 235 that identifies the particular conditions currently present in the environment of the user when music media file 200A was selected and correlates the ambient factors $AFa_1$ 215, $AFa_2$ 220, $AFa_3$ 225, $AFa_4$ 230, $AFa_5$ 235 with that music media file 200A in the datastore 260 as ambient influence information $AII_a$ 250A.

In general, two kinds of events trigger the predictive program 240 to update the ambient influence information file 250A associated with a music media file 200A stored in the datastore 260 of the portable media player 100.

A first event type refers to a manual music media file 200A selection which represents the situation where a user manually selects a music media file 200A from a plurality of music media files stored in the datastore 260 from a menu displayed on the user interface 30. The second type of event refers to an automated music media file selection which represents the situation where the predictive program 240 running on the portable media player 100 automatically selects and suggests and/or plays a music media file to the user and the user optionally accepts the suggestion. The user's optional acceptance may be performed by explicit an action such as pressing a button or selecting a user interface option, or may be performed by default as a result of the user not explicitly rejecting the suggestion.

A reasonable presumption is made that the manual music media file selection by the user is more indicative of a user's personal music preferences at a particular time than an automated music media file selection. As such, the correlation between the selection of a particular music media file and the historical ambient influence information $AII_a$ 250A is considered to be weaker when it is the result of an automated music media file selection. To accommodate such different correlation strengths between a musical selection and the recorded ambient influence information that is collected and stored by the predictive program 240 at the time when a particular music preference is expressed by the user, weighting factors may optionally be stored along with the ambient influence information $AII_a$ 250A for each selection of a particular music media file by the user.

The weighting factors may also reflect the relative importance of each of the ambient factors within a particular set of ambient influence information. For example the time of day that the music media file selection was made may be weighted heavier than the user's pulse rate. Such weighting factors are shown for example as $Uw_a$ 241, $Tw_a$ 242, $Sw_a$ 243, $Mw_a$ 244, and $Dw_a$ 246.

In addition, when a user selects a music media file 200A either manually and/or through an automated selection process, the predictive program 240 of the present invention may query the user to provide through the user interface 60 a subjective rating that indicates a level or strength value to the user's current music media file selection preference. For example the user may be prompted to provide a subjective rating value from 1 to 10 indicating the strength or level of preference to the current music media file selection. This subjective rating may also be used to influence the weighting factors that are used to correlate a particular set of ambient influence information.

Therefore, if a user spontaneously selects a particular music media file and then provides a high subjective rating of 9 (on a scale of 1 to 10) indicating his level of preference to the particular music media file, numerically high weighting factors will be used when correlating the users music media file selection to the ambient influence information determined at the time the selection was made.

Conversely, if a user selects a particular music media file 200A and then provides a lower subjective rating of 4 (on a scale of 1 to 10) indicating his level of preference to the particular music media file, numerically smaller weighting factors will be used when correlating the users music media file selection to the ambient influence information determined at the time the selection was made.

In various embodiments of the invention, the weighting factors are stored along with ambient influence information 250A in the datastore 260. Alternately, in other embodiments of the invention, the weighting factors are mathematically combined with some or all of the data represented in the ambient influence information which are then stored as weighted values.

In another example, the chronological information 15 may relate to the current time of the day (TOD) and may be mathematically combined with a time weighting factor $Tw_a$ 242 to arrive at a second weighted ambient factor component $AFa_2$ 220. Likewise, the sensor signals 75, for example, may be used to monitor the ambient temperature.

The ambient temperature may then be mathematically combined with a temperature weighting factor, $Sw_a$ 243 to arrive at a third ambient factor component $AFa_3$ 225. Thus, each time that the predictive program 240 receives an interrupt signal from the user interface 60 that the user has selected a music media file 250A from the plurality of music media files stored in the datastore 260 of the portable media player 100, the predictive program 240 accesses and stores 245 ambient influence information $AII_a$ 250A optionally with or without the use of weighting factors.

The determined ambient influence information is stored in one or more ambient influence information file(s) $AII_n$ 250N where the accumulated sets of ambient influence information determined for a plurality of historical music media file selections 200N is each relationally 255N associated with the music media files 200N that was selected by the user at that time.

In the exemplary embodiment shown in FIG. 2, the relational association 255A is performed through the use of a unique identifier ID 265A associated with a corresponding music media file 200A and its associated ambient influence information file $AII_a$ 250A, both of which may be stored in the datastore 260. The unique identifier ID 265A of the music media file 200A is used as an index to the unique identifier 270A of its associated ambient influence information file $AII_a$ 250A and visa versa.

In one exemplary embodiment of the present invention, the ambient influence information file $AII_a$ 250A is configured to accumulate up to 20 sets of ambient influence information $AII_a$ 250A for past music media file selections of each music media file stored within datastore 260. In this example, the ambient influence information $AII_a$ 250A represents the ambient factors $AFa_1$ 215, $AFa_2$ 220, $AFa_3$ 225, $AFa_4$ 230, $AFa_5$ 235 present in the environment of the user for each of the last 20 times the user selected that particular music media file. The ambient influence information $AII_a$ 250A may represent the time of day, the cloud conditions, and the GPS location of the user, that was recorded for each of the last 20 times that a particular music media file 200A was selected by the user.

A circular file arrangement may be implemented to limit the size of accumulated ambient influence information $AII_a$ 250A. For example, when a music media file 200A is user selected more than N times, the ambient influence information file $AII_a$ 250A may be configured to overwrite the oldest set of ambient factors recorded in the ambient influence information file $AII_a$ 250A. In this way only data for the maximum N of the most recent selections of a particular music media file 200A is accumulated within the ambient influence information file $AII_a$ 250A.

In an exemplary embodiment of the invention, the ambient influence information file $AII_a$ 250A provides a data structure that is indexed by its unique identifier ID 270A and configured to store up to N sets of ambient influence information for each ID (with or without weighting factors); where each of the N sets of ambient influence information $AII_a$ 250A represents a historical set of ambient factors $AFa_1$ 215, $AFa_2$ 220, $AFa_3$ 225, $AFa_4$ 230, $AFa_5$ 235 present at a given time the user selected the music media file 200A having the unique identifier ID 265A.

Once the ambient factors $AFa_1$ 215, $AFa_2$ 220, $AFa_3$ 225, $AFa_4$ 230, $AFa_5$ 235 have been has been collected and stored in the ambient influence information file $AII_a$ 250A in the datastore 260 and relationally retrievable 255A by the predictive program 240, the predictive program 240 may be operative to automatically select, suggest and/or play a particular music media file 200A from the plurality of music media files 200N stored in the datastore 260. Selection of the music media file 200A being made at least in part upon correlations with one or more current ambient factors $AFa_1$ 215, $AFa_2$ 220, $AFa_3$ 225, $AFa_4$ 230, $AFa_5$ 235 with the ambient influence information $AII_a$ 250A available in the datastore 260. This process is performed each time the predictive program 240 determines that a music media file 200A should be selected, suggested and/or played for the user.

Figure 2A:
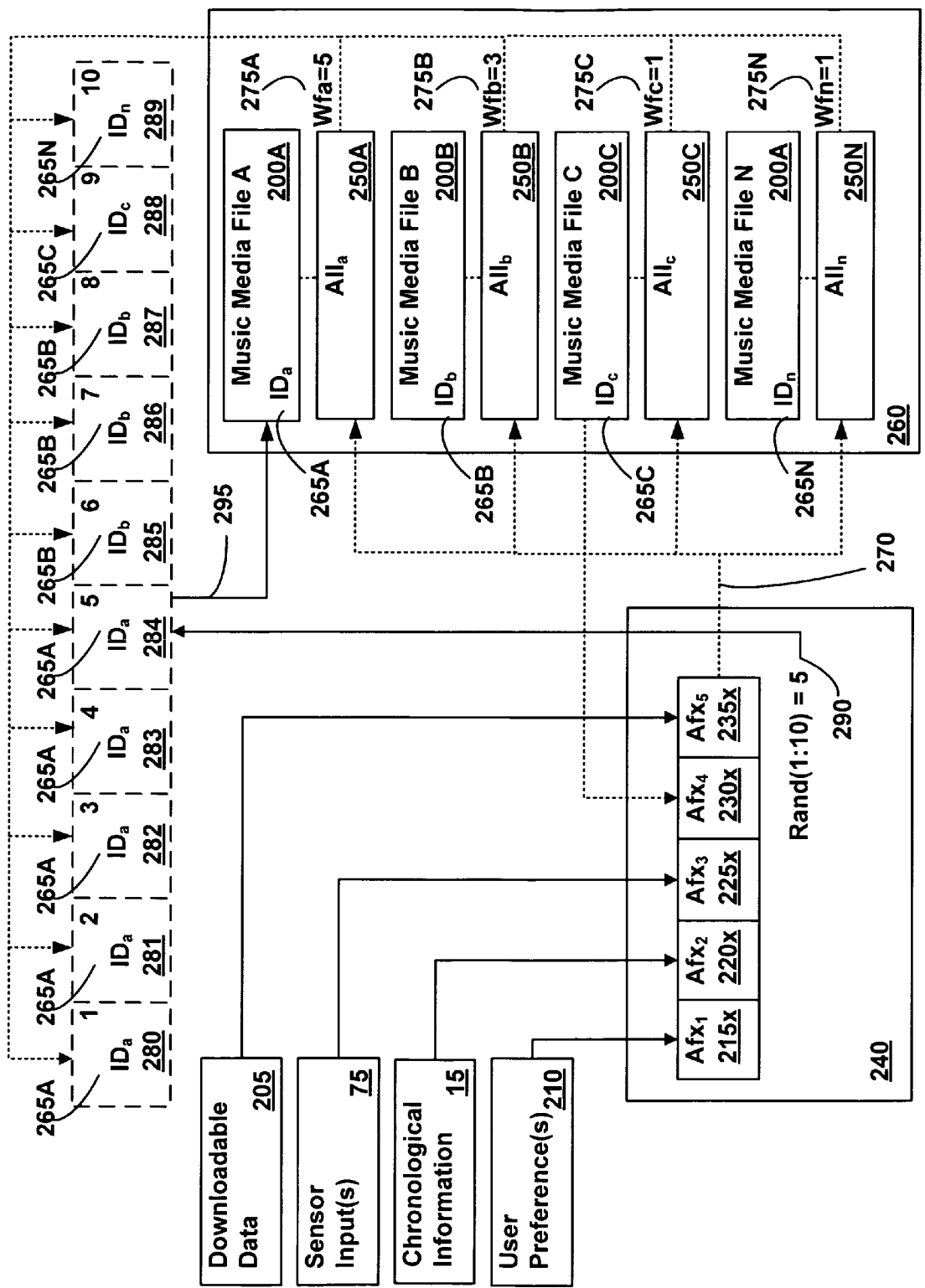
FIG. 2A—depicts an embodiment of the invention in which the predictive application is utilizing the accumulated ambient influence information and other information to select, suggest or play a music media file.

Referring to FIG. 2A, in an exemplary embodiment of the invention, the predictive program 240 may be configured to perform the automated selection process each time a currently playing music media file 200C and/or list of pending music media files has completed playing and/or is nearing completion of play. The predictive program 240 receives ambient factor data from the sensor inputs 75, chronological information 15, user preferences 210, and/or external downloadable data 205 and optionally musical information related to the currently playing music media file 200C to determine the current ambient factors $Afx_1$ 215$x$, $Afx_2$ 220$x$, $Afx_3$ 225$x$, $Afx_4$ 230$x$, $Afx_5$ 235$x$ potentially influencing the user at the present time.

Using the recorded ambient influence information $AII_a$ 250A, $AII_b$ 250B, $AII_c$ 250C, $AII_n$ 250N stored for the plurality of music media files 200A, 200B, 200C, 200N the predictive program 240 determines 270 the correlated weighted factors Wfa 275A, Wfb 275B, Wfc 275C, Wfn 275N for the weighted random selection process. The correlated weighted factors Wfa 275A, Wfb 275B, Wfe 275C, Wfn 275N used in the weighted random selection process are determined algorithmically such that those music media files 200A, 200B, 200C, 200N having stored ambient influence information with the closest statistical correlation to the current ambient factors 215$x$, $Afx_2$ 220$x$, $Afx_3$ 225$x$, $Afx_4$ 230$x$, $Afx_5$ 235$x$ are weighted to provide the greatest chance of being selected at random 290 from, for example, a randomization array 280-289.

In this example, the predictive program 240 determined that music media file A 200A has a correlated weighted factor Wfa 275A of 5, music media file B 200B having a correlated weighting factor Wfb 275B of 3, music media file C 200C having a correlated weighting factor Wfc 275C of 1 and music media file N 200N having a correlated weighting factor Wfn 275N of 1 as well As such, the unique identifier ID 265A associated with music media file A 200A will occupy 5 out of the 10 elements of the array 280-284, the unique identifier ID 265B associated with music media file B 200B will occupy 3 out of 10 elements of the array 285-287, the unique identifier ID 265C associated with music media file C 200C will occupy 1 out of 10 elements of the array 288 and the unique identifier ID 265N associated with music media file N 200N will occupy 1 out of 10 elements of the array 289. A random number generator 290 is used to determine which of the array elements 280-289 will be selected. In this example, array element 5 284 is selected which contains the unique identifier ID 265A associated with music media file A 200A. Music media file A 200A is selected using its associated unique identifier ID 265A and suggested or automatically played for the user.

The randomization array size of 10 elements 280-289 used in this example was determined arbitrarily to illustrate the weighted selection process is performed. In actual practice, the size of the array may be based upon the number of available music media files available for selection.

The determination of the correlated weighting factors Wfa 275A, Wfb 275B, Wfc 275C, Wfn 275N many be performed by many algorithms known in the relevant art. The algorithms selected should be able to provide a level of correlation between one or more of the current ambient factors $215x$, $Afx_2$ $220x$, $Afx_3$ $225x$, $Afx_4$ $230x$, $Afx_3$ $235x$ and one or more of the recorded ambient influence information $AII_a$ 250A, $AII_b$ 250B, $AII_c$ 250C, $AII_n$ 250N.

In various embodiments of the invention, correlation of chronological, meteorological, geo-spatial, physiological, and behavioral ambient factors with ambient influence information may be arranged to have varying impacts upon the computation of the correlated weighted factors for a particular musical media file. For example, in one embodiment chronological ambient factors may be weighted to have three times the computational effect upon the correlated weighted factor than meteorological ambient factors.

Storage of the accumulated ambient factor data may be accomplished in a datastore by many common arrangements. For example, the data structure shown below may be used to maintain the accumulated data. In this example data structure, a unique identifier ID is associated with each music media file stored in the datastore and n is a value between 0 and N, representing the ambient influence information specific to a particular recorded ambient factor and N representing the maximum number of sets of recorded ambient factors to be maintained. One skilled in the art will appreciate that the data structure for storing the accumulated ambient factors may take a variety of forms.

EXAMPLE DATA STRUCTURE

Ambient_Influence_Information.time_of_day[ID,n]
Ambient_Influence_Information.day_of_week[ID,n]
Ambient_Influence_Information.season_of_year[ID,n]
Ambient_Influence_Information.ambient_temperature [ID,n]
Ambient_Influence_Information.sun_condition[ID,n]
Ambient_Influence_Information.weather_condition[ID, n]
Ambient_Influence_Information.GPS_location[ID,n]
Ambient_Influence_Information.user_velocity[ID,n]
Ambient_Influence_Information.user_heart_rate[ID,n]
Ambient_Influence_Information.user_gait_speed[ID,n]
Ambient_Influence_Information.scheduled_life_event [ID,n]

In various embodiments of the invention, each set of n historical accumulations of ambient factors for each music media file ID may be used by the predictive program 240 to determine and maintains a statistical measure of a central tendency for each recorded ambient factors (e.g., time of day, cloud conditions, user pulse rate.) This may be accomplished for example using simple statistical mean and standard deviation(s) across the total number N of accumulated historical ambient factors for each unique identifier ID associated with a music media file.

Alternatively, this may be accomplished by performing a frequency distribution analysis across the total number N of accumulated historical ambient factors where the recorded ambient factor data is processed to determine which ambient factor data values or ranges of ambient factor data values occur with the highest frequency in the set of ambient factor data stored. For example, N=20 historical time of day values may be stored for a music media file of ID=1213. A frequency distribution analysis may be performed on the 20 ambient factor data points to determine which ranges of times of day occur most frequently in the data.

For example, the analysis may be performed using predefined ranges of MIDNIGHT-4 AM, 4 AM-8 AM, 8 AM-NOON, NOON-4 PM, 4 PM-8 PM, and 8 PM to MIDNIGHT. Each of these ranges is generally called a bin. The analysis is performed by sorting each of the 20 time-of-day values into their respective bins and then determines what frequency samples fall into each bin.

In this example, a particular user may have selected a particular music media file with ID=1341 at times of day in the past such that 18 of the 20 time of day values stored in the ambient influence information datastore fall within 8 PM to MIDNIGHT time range bin. Thus the frequency would be 18/20 or 90% of the time this music media file was selected by the user during this time range, thereby providing a statistical correlation between the user's preference to that particular music media file and the time of day. The same type of bin analysis may be performed for other collected data such as pulse rates, GPS location ranges, days-of-the-week, scheduled life events, etc.

In this way, the ambient influence information file maintains statistical correlations between its associated music media file based on correlations made with one or more ambient factors and a user's preference for the particular music media file.

One skilled in the art will appreciate that the storage and use of ambient factor data for the predictive selection of individual music media files may be used for individual music media files, musical albums, musical artists, and musical genres.

Figure 3:
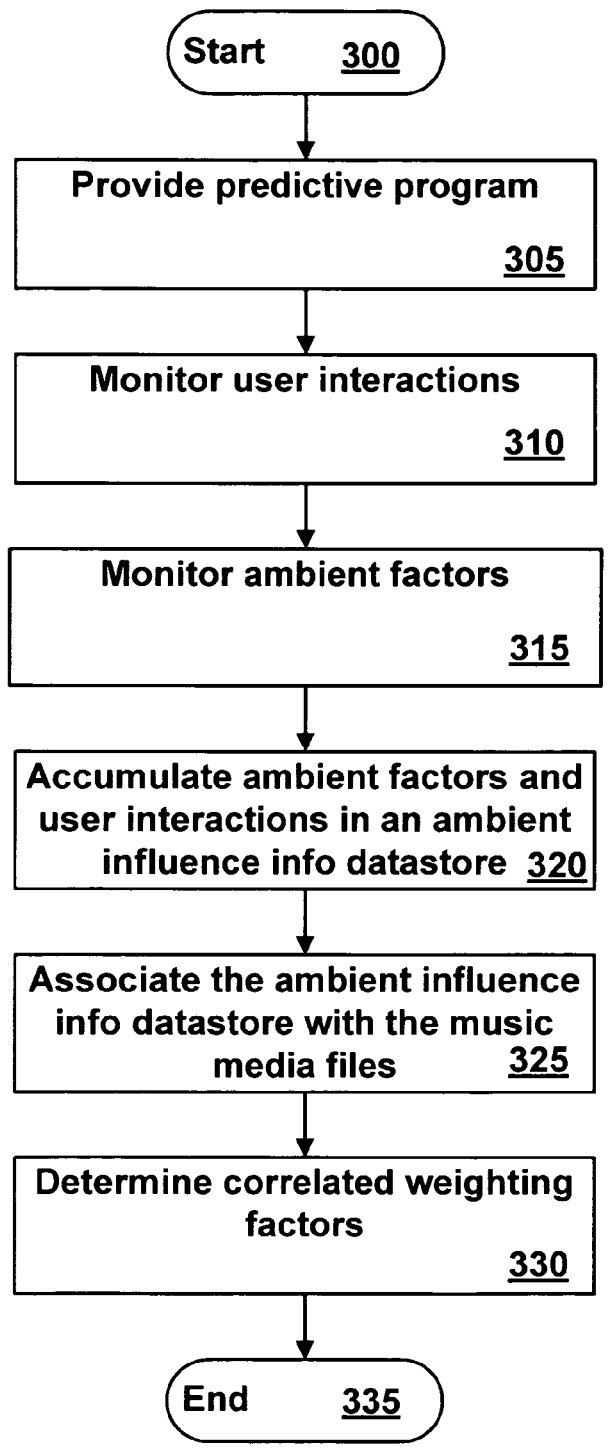
FIG. 3—depicts a first flow chart of an embodiment of the invention in which the predictive application is accumulating ambient factors and other information for future music media file prediction.

Referring to FIG. 3, a flow chart is provided which depicts the process for accumulating ambient factor data including chronographic, meteorological, geo-spatial, behavioral, and/or physiological information for correlation with one or music media files. The process is initiated 300 by loading at least one predictive program 305 into the main memory of a portable media player. The predictive program monitors user interactions 310 and ambient factor data 315 received by the portable media player and accumulates the ambient factors and user responses to the selection and/or acceptance of a music media file in an ambient information datastore 320. The predictive program may also perform a statistical analysis upon the stored values to determine a central tendency of certain values with respect to each music media file.

In some embodiments the statistical analysis includes a frequency analysis upon one or more sets of chronographic, meteorological, geo-spatial, behavioral, and/or physiological data.

The ambient information datastore is relationally associated with the music media files 325 from which correlated weighting factors can be determined between the ambient factors and ambient information datastore 330. The correlated weighting factors are used to determine the probability that a particular music media file will be selected for suggesting or playing to a user using for example the method provided in the description under FIG. 3A below.

Figure 3A:
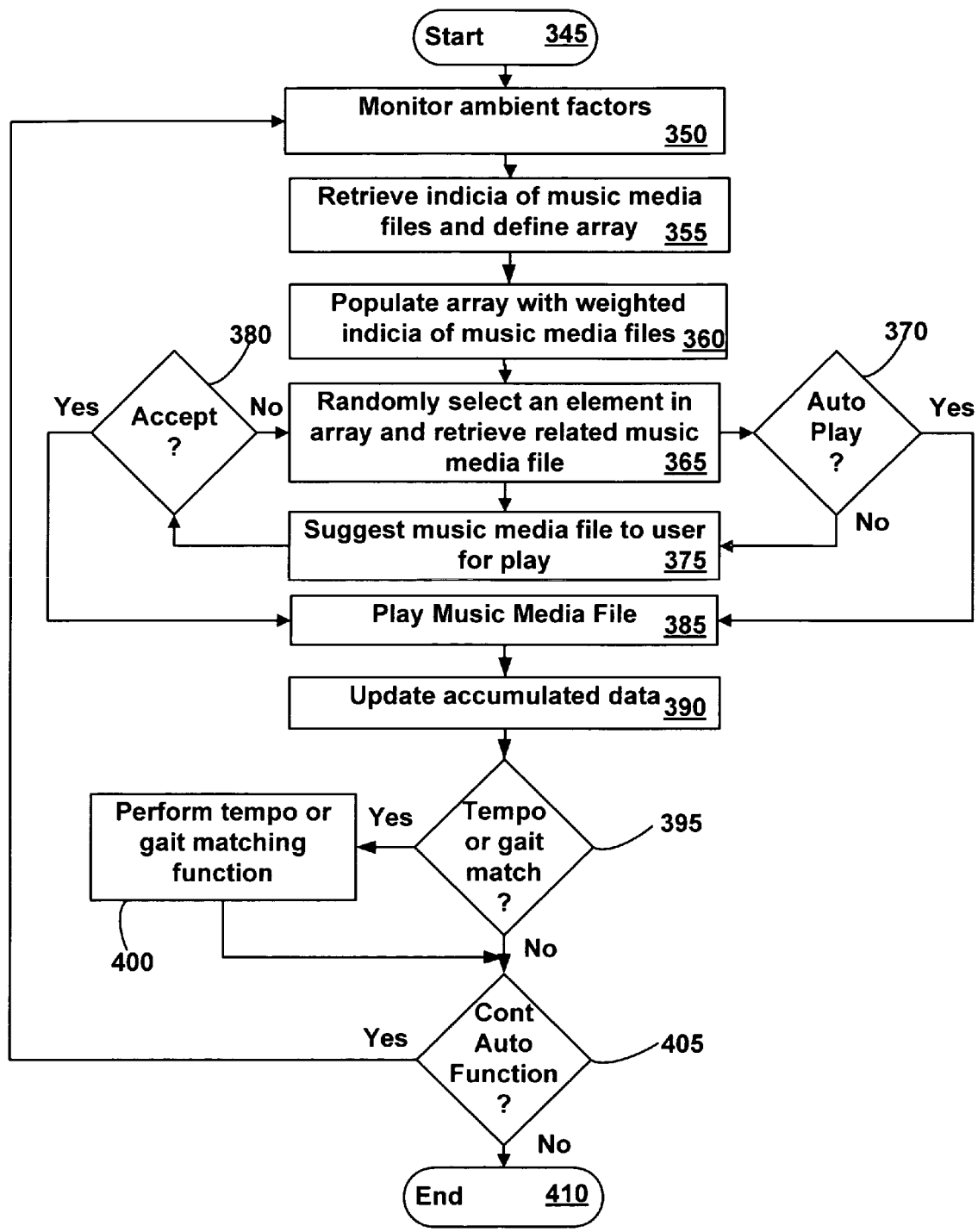
FIG. 3A—depicts a second flow chart of an embodiment of the invention in which the predictive application is utilizing the accumulated ambient influence information and correlated weighting factors to select, suggest or play a music media file

Referring to FIG. 3A, a flow chart is provided which depicts the process for selecting a music media file for suggesting or playing in dependence on correlations made between current ambient factors and accumulated ambient influence information associated with one or music media files stored in a datastore.

The process is initiated 345 by a predictive program monitoring the current ambient factors. The predictive program determines correlated weighted factors for each of a plurality of music media files stored in a datastore based upon the stored ambient influence information and the current ambient factors.

The predictive program then populates a randomization array with a weighted number of unique identifier instances 360 or indicia associated with each music media file based upon the correlated weighted factors determined for each particular music media file.

A random selection of an element of the array is performed and a music media file associated with the unique identifier contained in the selected array element is used to retrieve the associated music media file from the datastore which then loaded into the main memory of the portable media player 365.

If the portable media player is configured to automatically play the retrieved music media file 370, the music media file begins playing 385 automatically after the currently playing music media file has finished. Alternately 370, if the portable media player is configured to suggest the selected music media file 375, the user is prompted to accept the suggested music media file 380.

If the user accepts the 380 the suggested music media file, the music media file begins playing 385 automatically after the currently playing music media file has finished. Alternately 380, if the user rejects the suggested music media file for playing, the predictive program selects another array element and retrieves its associated music media file which again is loaded into the main memory of the portable media player 10 (FIG. 1) 365. This process may repeat until a desired music media file is suggested by the predictive program, accepted and played by the user.

Once a music media file has been accepted and/or has begun playing, the accumulated ambient influence information data associated with the music media file is updated 390. For example, if the music media file has been accepted by the user, the ambient influence information data associated with that music media file may be updated to reflect the positive association between the current ambient information and the accepted music media file. In this way the correlation between the current ambient factors and the accepted music media file is strengthened.

In some embodiments of the present invention, if the music media file is rejected by the user, the ambient influence information data associated with that music media file may be updated to reflect the negative association between the current ambient information and the rejected music media file. In this way the correlation between the current ambient factors and the rejected music media file is weakened.

An option is available for the predictive program to adjust the tempo or perform gait matching of a music media file to correlate with a sensor signal, for example a sensor signal providing data indicative of a users walking speed and/or other user motion characteristics. If this option is desired 395, the tempo adjustment or gaits matching functions are performed 400.

Alternately 395, if tempo adjustment or perform gait matching is not desired or already has been accomplished, an option is provided to allow continuation of the automated music media file selection. If this option is desired 405, the predictive program continues monitoring user interactions and sensor signals to suggest or play another music media file 350.

Alternately, if automated music media file selection is no longer desired 405, the portable media player user cancels the automated function which ends the process 410.

The foregoing described embodiments of the invention are provided as illustrations and descriptions. They are not intended to limit the invention to precise form described. In particular, it is contemplated that functional implementation of the invention described herein may be implemented equivalently in hardware, software, firmware, and/or other available functional components or building blocks.

No specific limitation is intended to a particular arrangement. Other variations and embodiments are possible in light of above teachings, and it is not intended that this Detailed Description limit the scope of invention, but rather by the Claims following herein.

What is claimed:

1. A predictive music media selection system for a portable media player comprising:
    a processor;
    a main memory coupled to said processor;
    a communications infrastructure coupled to said processor;
    a user interface coupled to the processor for accepting a user input;
    a secondary memory coupled to said communications infrastructure having retrievably stored therein;
    a plurality of music media files playable by said processor;
    a store of ambient influence information relationally associated with each of said plurality of music media files;
    an ambient factors providing circuit operatively coupled to said communications infrastructure for determining a plurality of current ambient factors;
    said main memory comprising at least one predictive program stored therein, having a plurality of instructions executable by said processor to:
    automatically suggest to the user one of said plurality of music media files stored in said secondary memory, the automatic suggestion being made in at least partial dependence on an assessment of correlation between said plurality of current ambient factors and said store of ambient influence information; and
    optionally and selectively accept the automatically suggested musical media file based on a determination that the user input indicates an optional and selective acceptance of the suggested musical media file, the optional and selective acceptance comprising a selection of a user-interface option provided by the at least one predictive program based on the assessment of correlation,
    whereby, if an automatically suggested media file is not specifically accepted, the automatically suggested media file is deemed rejected and is automatically replaced by a subsequent automatically suggested media file of the plurality of musical media files, the subsequent automatically suggested media file also being suggested in at least partial dependence on an assessment of a correlation between the plurality of current ambient factors and the store of ambient influence information.

2. The system according to claim 1, wherein said at least one predictive program further includes a plurality of instructions executable by said processor to perform at least one action selected from a group consisting essentially of selecting, suggesting, and automatically playing at least one of said plurality of music media files using a weighted random selection process.

3. The system according to claim 2, wherein said weighting is derived at least in part from a correlation between said plurality of current ambient factors and said store of ambient influence information.

4. The system according to claim 1, wherein said at least one predictive program further includes a plurality of instructions executable by said processor to perform at least one action, selected from a group consisting essentially of altering a tempo and matching a gait of a user, on a playing music media file in dependence on[at least one sensor signal] said current ambient factors.

5. A computer program product for a portable media player embodied in a tangible form having a plurality of instructions executable by a processor to perform at least one action selected from a group consisting of automatically selecting, automatically suggesting, and automatically playing at least one music file from a plurality of music media files stored in a datastore in dependence on an assessment of correlation between a plurality of current ambient factors and accumulated ambient influence information,
wherein said instructions further includes a plurality of instructions executable by said processor to monitor a plurality of user's media selections upon said portable media player and said plurality of current ambient factors to determine said correlation and optionally and selectively accept the automatically suggested musical media file based on a determination that a user input indicates an optional and selective acceptance of the suggested musical media file, the optional and selective acceptance comprising a selection of a user-interface option provided by the at instructions based on the assessment of correlation, whereby, if an automatically suggested media file is not specifically accepted, the automatically suggested media file is deemed rejected and is automatically replaced by a subsequent automatically suggested media file of the plurality of musical media files, the subsequent automatically suggested media file also being suggested in at least partial dependence on an assessment of a correlation between the plurality of current ambient factors and the store accumulated ambient influence information.

6. The computer program product according to claim 5, wherein said plurality of instructions further includes a plurality of instructions executable by said processor to retrievably store said correlation in a relational association with said accumulated ambient influence information.

7. The computer program product according to claim 5, wherein said plurality of instructions further includes a plurality of instructions executable by said processor to perform at least one action, selected from a group consisting essentially of altering a tempo and matching a gait of a user, of a playing music media file in dependence on said current ambient factors.

8. The computer program product according to claim 5, wherein said accumulated ambient influence information includes a plurality of established relationships between a plurality of user's music preferences and at least said plurality of current ambient factors.

9. The computer program product according to claim 5, wherein said tangible form comprises at least one element selected from a group consisting essentially of magnetic media, optical median, and logical media.

10. A method of providing a predictive music media selection system for a portable media player comprising:
providing a processor;
providing a main memory coupled to said processor;
providing a communications infrastructure coupled to said processor;
providing a user-interface coupled to the processor for accepting a user input;
providing a secondary memory coupled to said communications infrastructure having retrievably stored therein;
providing a plurality of music media files playable by said processor;
providing a store of ambient influence information relationally associated with each of said plurality of music media files;
providing an ambient-factors-providing circuit operatively coupled to said communications infrastructure for determining a plurality of current ambient factors;
encoding within said main memory at least one predictive program, stored therein and having instructions executable by said processor to:
automatically suggest to the user one of said plurality of music media files stored in said secondary memory, the automatic suggestion being made in at least partial dependence on an assessment of a correlation between said plurality of current ambient factors and said store of ambient influence information; and
optionally and selectively accept the automatically suggested musical media file based on a determination that the user input indicates an optional and selective acceptance of the suggested musical media file, the optional and selective acceptance comprising a selection of a user-interface option provided by the at least one predictive program based on the assessment of correlation,
whereby, if an automatically suggested media file is not specifically accepted, the automatically suggested media file is deemed rejected and is automatically replaced by a subsequent automatically suggested media file of the plurality of musical media files, the subsequent automatically suggested media file also being suggested in at least partial dependence on an assessment of a correlation between the plurality of current ambient factors and the store of ambient influence information.

11. The method according to claim 10, wherein said at least one predictive program providing step further comprises providing the plurality of instructions executable by said processor to perform at least one action selected from a group consisting essentially of selecting, suggesting, and automatically playing at least one of said plurality of music media files using a weighted random selection process.

12. The method according to claim 11, wherein the plurality of instructions providing step comprises using the weighted random selection process by weighting derived, at least in part, from a correlation between said current ambient factors and said store of ambient influence information.

13. The method according to claim 10, wherein said at least one predictive program providing step further comprises providing the plurality of instructions executable by said processor to perform at least one action, selected from a group consisting essentially of altering a tempo and matching a gait of a user, on a playing music media file in dependence on said current ambient factors.

14. The method according to claim 10, wherein the current ambient factors include data indicative of user motion characteristics.

15. The method according to claim 10, wherein the ambient-factors-providing circuit accesses a current weather condition for the user and wherein the automatically suggested media file is suggested based at least in part upon said current weather condition.

16. The method according to claim 10, wherein the automatically suggested media file is suggested based in part upon at least one of the current air temperature, the current sun conditions, and the current season of the year.

* * * * *

UNITED STATES PATENT AND TRADEMARK OFFICE
CERTIFICATE OF CORRECTION

PATENT NO. : 7,542,816 B2  Page 1 of 1
APPLICATION NO. : 11/267079
DATED : June 2, 2009
INVENTOR(S) : Louis B. Rosenberg It is certified that error appears in the above-identified patent and that said Letters Patent is hereby corrected as shown below:

Claim 4, column 17, line 17, delete "[at least one sensor signal]".
Claim 9, column 18, line 2, delete "median" and insert --media--.

Signed and Sealed this

Eighteenth Day of August, 2009

David J. Kappos
*Director of the United States Patent and Trademark Office*